US012645779B2

(12) United States Patent
Sato et al.

(10) Patent No.: US 12,645,779 B2
(45) Date of Patent: Jun. 2, 2026

(54) AUTHENTICATION SYSTEM, SERVER APPARATUS AND METHOD

(71) Applicant: NEC Corporation, Tokyo (JP)

(72) Inventors: Tomoya Sato, Tokyo (JP); Haruka Kurose, Tokyo (JP); Takumi Otani, Tokyo (JP); Takeshi Sasamoto, Tokyo (JP)

(73) Assignee: NEC CORPORATION, Tokyo (JP)

( * ) Notice: Subject to any disclaimer, the term of this patent is extended or adjusted under 35 U.S.C. 154(b) by 139 days.

(21) Appl. No.: 18/832,560

(22) PCT Filed: Feb. 14, 2022

(86) PCT No.: PCT/JP2022/005529
§ 371 (c)(1),
(2) Date: Jul. 24, 2024

(87) PCT Pub. No.: WO2023/152937
PCT Pub. Date: Aug. 17, 2023

(65) Prior Publication Data
US 2025/0111025 A1      Apr. 3, 2025

(51) Int. Cl.
*G06F 21/00*      (2013.01)
*G06F 21/32*      (2013.01)
*G06V 40/16*      (2022.01)

(52) U.S. Cl.
CPC ............ *G06F 21/32* (2013.01); *G06V 40/171* (2022.01); *G06V 40/172* (2022.01)

(58) Field of Classification Search
CPC ....... G06F 21/32; G06F 21/31; G06V 40/171; G06V 40/172; G06Q 50/10
See application file for complete search history.

(56) References Cited

U.S. PATENT DOCUMENTS

| | | | |
|---|---|---|---|
| 11,238,144 B2 * | 2/2022 | Tawada | .................. G06V 40/70 |
| 2016/0094756 A1 * | 3/2016 | Onishi | ................. H04N 1/0097 |
| | | | 358/1.14 |

(Continued)

FOREIGN PATENT DOCUMENTS

| | | |
|---|---|---|
| JP | 2008-293437 A | 12/2008 |
| JP | 2018-005691 A | 1/2018 |

(Continued)

OTHER PUBLICATIONS

International Search Report for PCT Application No. PCT/JP2022/005529, mailed on May 10, 2022.
Written opinion for PCT Application No. PCT/JP2022/005529, mailed on May 10, 2022.
JP Decison of Refusal for Japanese patent application No. 2023-159365, mailed on Feb. 25, 2025.

(Continued)

*Primary Examiner* — William A Corum, Jr.
(74) *Attorney, Agent, or Firm* — Sughrue Mion, PLLC

(57) ABSTRACT

A system includes an authentication terminal and a server apparatus. The authentication terminal is an apparatus that can operate in different modes of operation corresponding to each of different procedure methods. The server apparatus includes a detection unit, a determination unit, and a mode control unit. The detection unit detects a waiting person waiting at a waiting area, where procedures are performed at the authentication terminal, using image data captured at the waiting area. The determination unit determines a type of the waiting person regarding the procedures to be proceeded with at the authentication terminal. The mode control unit instructs the authentication terminal to change the mode of operation, when the type of the waiting person is not consistent with a mode of operation of the authentication terminal.

11 Claims, 16 Drawing Sheets

(56) References Cited

U.S. PATENT DOCUMENTS

| | | | |
|---|---|---|---|
| 2020/0380103 A1* | 12/2020 | Hosoda | G06F 21/35 |
| 2021/0073366 A1* | 3/2021 | Narita | H04N 1/00514 |
| 2021/0200999 A1* | 7/2021 | Hayase | G06V 40/161 |
| 2021/0216617 A1* | 7/2021 | Semba | G06T 7/00 |
| 2023/0113395 A1 | 4/2023 | Kawase | |

FOREIGN PATENT DOCUMENTS

| | | |
|---|---|---|
| JP | 2019-144695 A | 8/2019 |
| JP | 2019-159468 A | 9/2019 |
| JP | 6819916 B1 | 1/2021 |
| WO | 2019/017439 A1 | 1/2019 |
| WO | 2021/090448 A1 | 5/2021 |
| WO | 2021/130948 A1 | 7/2021 |
| WO | 2021/166066 A1 | 8/2021 |
| WO | 2021/199338 A1 | 10/2021 |

OTHER PUBLICATIONS

Akitoshi Okumura et al., "Improving Identity Verification for Ticket Holders of Large-scale Events using Non-stop Face Recognition System", Information Processing Society of Japan (IPSJ) Technical Report on Consumer Devices & Systems (CDS), Japan, May 18, 2017, vol. 2017—CDS-19 No. 19, pp. 1-8.

JP Office Action for JP Application No. 2023-159365, mailed on Jul. 30, 2024 with English Translation.

JP Office Action for JP Application No. 2023-159365, mailed on Nov. 12, 2024 with English Translation.

International preliminary report on patentability (Chapter I of the Patent Cooperation Treaty) for International application No. PCT/JP2022/005529, mailed on May 10, 2022.

English translation of the international preliminary report on patentability (Chapter I of the Patent Cooperation Treaty) for International application No. PCT/JP2022/005529, mailed on May 10, 2022.

* cited by examiner

START

S1 DETECT WAITING PERSON

S2 DETERMINE TYPE OF WAITING PERSON

S3 INSTRUCT TO CHANGE MODE OF OPERATION

END

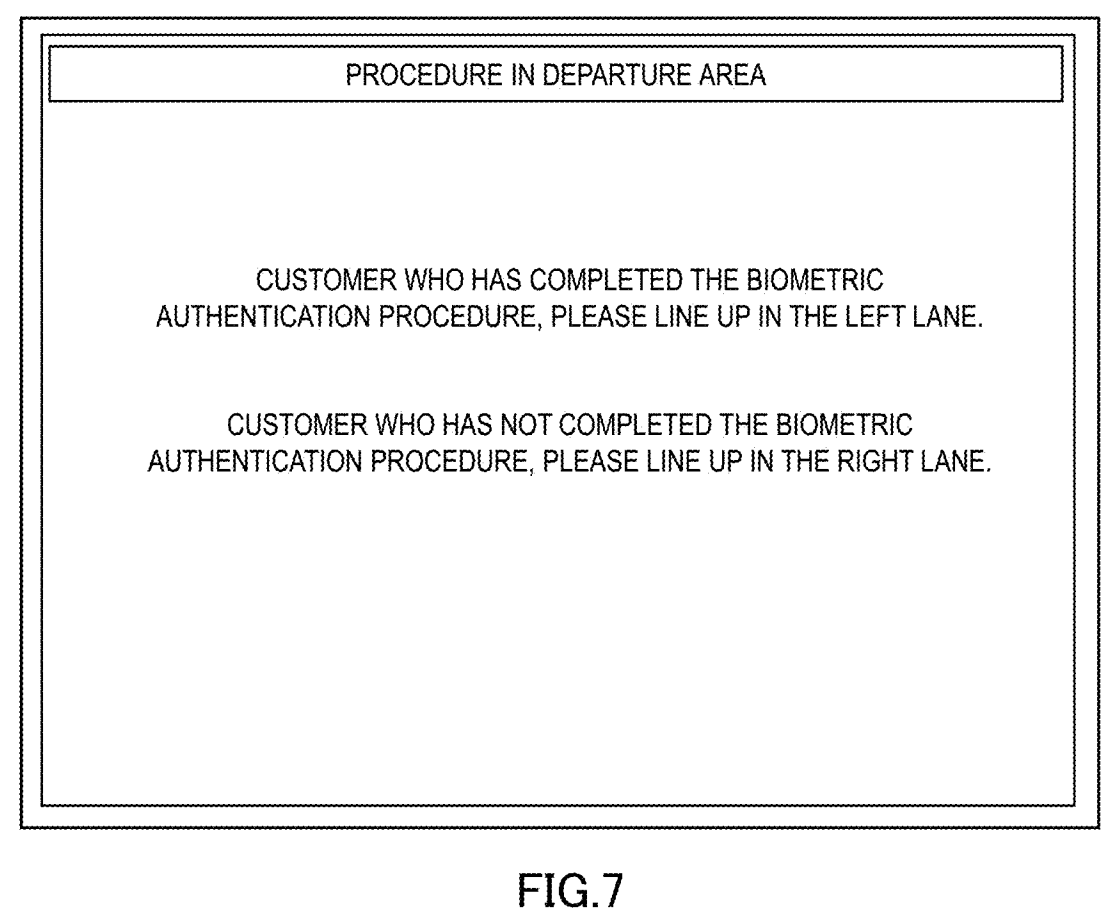

PROCEDURE IN DEPARTURE AREA

CUSTOMER WHO HAS COMPLETED THE BIOMETRIC
AUTHENTICATION PROCEDURE, PLEASE LINE UP IN THE LEFT LANE.

CUSTOMER WHO HAS NOT COMPLETED THE BIOMETRIC
AUTHENTICATION PROCEDURE, PLEASE LINE UP IN THE RIGHT LANE.

FIG.7

REGISTERED PERSON INFORMATION DATABASE

| TOKEN ID | BIOMETRIC INFORMATION | PASSPORT INFORMATION | | BOARDING PASS INFORMATION | | | |
|---|---|---|---|---|---|---|---|
| | | PASSPORT NUMBER | ... | FLIGHT NUMBER | SEAT NUMBER | ... | ... |
| tID11 | FV11 | P11 | ... | FL11 | S11 | ... | ... |
| tID12 | FV12 | P12 | ... | FL12 | S12 | ... | ... |
| ... | ... | ... | ... | ... | ... | ... | ... |

FIG.11

| CAMERA ID | ID OF BOARDING GATE APPARATUS | INITIAL MODE | ... |
|---|---|---|---|
| cID01 | 14-1 | BIOMETRIC AUTHENTICATION COMPATIBLE MODE | ... |
| cID02 | 14-2 | BIOMETRIC AUTHENTICATION COMPATIBLE MODE | ... |
| cID03 | 14-3 | BIOMETRIC AUTHENTICATION NON-COMPATIBLE MODE | ... |
| cID04 | 14-4 | BIOMETRIC AUTHENTICATION NON-COMPATIBLE MODE | ... |
| ... | ... | ... | ... |

FIG.12

AUTHENTICATION SYSTEM, SERVER APPARATUS AND METHOD

This application is a National Stage Entry of PCT/JP2022/005529 filed on Feb. 14, 2022, the contents of all of which are incorporated herein by reference, in their entirety.

TECHNICAL FIELD

The present invention relates to a system, a server apparatus, a control method of a server apparatus, and a storage medium.

BACKGROUND ART

The development of technologies aimed at increasing convenience for airport users and improving operational efficiency within airports is underway.

For example, Patent Literature 1 describes providing a gate apparatus that contributes to improving efficiency of an immigration inspection system. The gate apparatus of Patent Literature 1 includes a communication unit and a switching unit. The communication unit communicates with a management server that calculates a ratio of users with a first nationality among all users undergoing immigration and emigration inspection and determines a mode of operation of the gate apparatus based on the calculated ratio of the users. The switching unit switches the mode of operation related to the immigration and emigration inspection of a target person to be inspected to the mode of operation determined by the management server.

CITATION LIST

Patent Literature

[PTL 1] International Publication WO2021/166066

SUMMARY OF INVENTION

Technical Problem

As described above, some airport procedures may be performed using biometric authentication. However, there also are users who choose to proceed with an existing procedure that does not use biometric authentication. In other words, users need to choose whether to proceed with a procedure using biometric authentication or in a manned lane where a staff member is stationed. Here, when a user makes a mistake in selecting a procedure method in the procedure area where the user can choose between a procedure method using biometric authentication and the existing procedure, throughput in the procedure area is decreased.

Note that the problem cannot be solved even by using the technologies disclosed in Patent Literature 1 above. Patent Literature 1 discloses that the mode of operation of the gate apparatus is determined in accordance with the nationality of the user undergoing the immigration and emigration inspection, and discloses a technology that is unrelated to the procedure method selected by the user.

It is a main object of the present invention to provide a system, a server apparatus, a control method of a server apparatus, and a storage medium that contribute to improving throughput in a procedure area where a user can proceed with a procedure using different methods.

Solution to Problem

According to a first aspect of the present invention, there is provided a system, including: an authentication terminal that can operate in different modes of operation corresponding to each of different procedure methods; and a server apparatus, wherein the server apparatus, includes: a detection unit that detects a waiting person waiting at a waiting area, where procedures are performed at the authentication terminal, using image data captured at the waiting area; a determination unit that determines a type of the waiting person regarding the procedures to be proceeded with at the authentication terminal; and a mode control unit that instructs the authentication terminal to change a mode of operation, when the type of the waiting person is not consistent with the mode of operation of the authentication terminal.

According to a second aspect of the present invention, there is provided a server apparatus, including: a detection unit that detects a waiting person waiting at a waiting area, where procedures are performed at an authentication terminal that can operate in different modes of operation corresponding to each of different procedure methods, using image data captured at the waiting area; a determination unit that determines a type of the waiting person regarding the procedures to be proceeded with at the authentication terminal; and a mode control unit that instructs the authentication terminal to change a mode of operation, when the type of the waiting person is not consistent with the mode of operation of the authentication terminal.

According to a third aspect of the present invention, there is provided a control method of a server apparatus, the control method comprising: detecting a waiting person waiting at a waiting area, where procedures are performed at an authentication terminal that can operate in different modes of operation corresponding to each of different procedure methods, using image data captured at the waiting area; determining a type of the waiting person regarding the procedures to be proceeded with at the authentication terminal; and instructing the authentication terminal to change a mode of operation, when the type of the waiting person is not consistent with the mode of operation of the authentication terminal.

According to a fourth aspect of the present invention, there is provided a computer-readable storage medium storing a program causing a computer mounted on a server apparatus to perform processing for: detecting a waiting person waiting at a waiting area, where procedures are performed at an authentication terminal that can operate in different modes of operation corresponding to each of different procedure methods, using image data captured at the waiting area; determining a type of the waiting person regarding the procedures to be proceeded with at the authentication terminal; and instructing the authentication terminal to change a mode of operation, when the type of the waiting person is not consistent with the mode of operation of the authentication terminal.

Advantageous Effects of Invention

The individual aspects of the present invention to provide a system, a server apparatus, a control method of a server apparatus, and a storage medium that contribute to improving throughput in a procedure area where a user can proceed with a procedure using different methods. The advantageous effect of the present invention is not limited to the above advantageous effect. The present invention may provide other advantageous effects, instead of or in addition to the above advantageous effect.

BRIEF DESCRIPTION OF THE DRAWINGS

FIG. 7 is a diagram illustrating an example of a display of a display device according to the first example embodiment.

FIG. 11 is a diagram illustrating an example embodiment of a registered person information database according to the first example embodiment.

FIG. 12 is a diagram illustrating an example of table information included in the server apparatus according to the first example embodiment.

EXAMPLE EMBODIMENT

Figure 1:
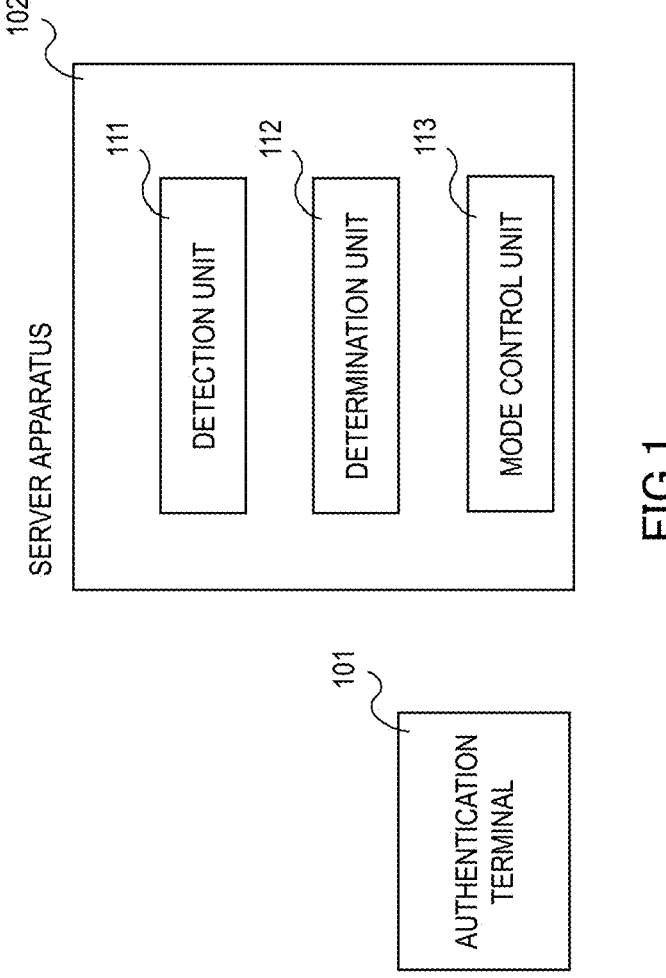
FIG. 1 is a diagram illustrating an outline of an example embodiment.

First, an outline of an example embodiment will be described. In the following outline, various components are denoted by reference characters for the sake of convenience. That is, the following reference characters are used as examples to facilitate the understanding of the present invention. Thus, the description of the outline is not intended to impose any limitations. In addition, unless otherwise specified, an individual block illustrated in the drawings represents a configuration of a functional unit, not a hardware unit. An individual connection line between blocks in the drawings signifies both one-way and two-way directions. An arrow schematically illustrates a principal signal (data) flow and does not exclude bidirectionality. In the present description and drawings, elements that can be described in a like way will be denoted by a like reference character, and redundant description thereof will be omitted as needed.

Figure 2:
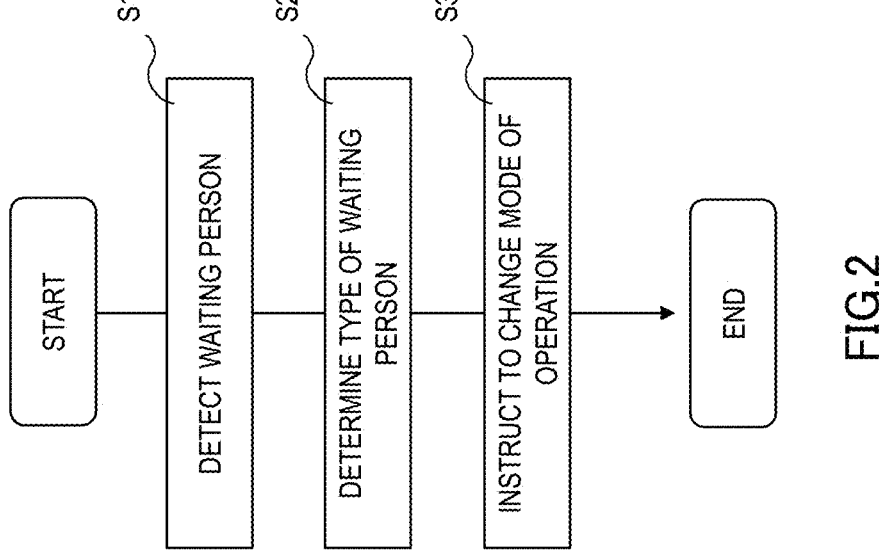
FIG. 2 is a flowchart illustrating an operation of an example embodiment.

A system according to an example embodiment includes an authentication terminal 101 and a server apparatus 102 (see FIG. 1). The authentication terminal 101 is an apparatus that can operate in different modes of operation corresponding to each of different procedure methods. The server apparatus 102 includes a detection unit 111, a determination unit 112, and a mode control unit 113. The detection unit 111 detects a waiting person waiting at a waiting area, where procedures are performed at the authentication terminal 101, using image data captured at the waiting area (step S1 in FIG. 2). The determination unit 112 determines a type of the waiting person regarding the procedures to be proceeded with at the authentication terminal 101 (step S2). When the type of the waiting person is not consistent with a mode of operation of the authentication terminal 101, the mode control unit 113 instructs the authentication terminal 101 to change the mode of operation (step S3).

The server apparatus 102 analyzes the image data of the waiting person waiting his or her turn to perform the procedure at the authentication terminal 101 installed in a procedure area, and determines the type of the waiting person. The server apparatus 102 determines whether the waiting person is a user who can perform the procedure using biometric authentication, or whether the waiting person is a user who cannot perform the procedure using biometric authentication. When the server apparatus 102 determines, as a result of the determination, that the type of the waiting person is not consistent with the mode of operation of the authentication terminal 101 where the waiting person is lined up, the server apparatus 102 instructs the authentication terminal 101 to operate in the mode of operation that matches the type of the waiting person. As a result, the waiting person (the user who lined up in the wrong lane) can perform the procedure at the authentication terminal 101 that matches the procedure method he or she has selected, thereby eliminating failures caused by the user performing the procedure at the authentication terminal 101 that corresponds to a wrong procedure. In other words, throughput (the number of users that can be processed by the authentication terminal) in the procedure area is improved because procedural failures at the authentication terminal 101 in the procedure area are reduced.

Hereinafter, specific example embodiments will be described in more detail with reference to drawings.

First Example Embodiment

Figure 3:
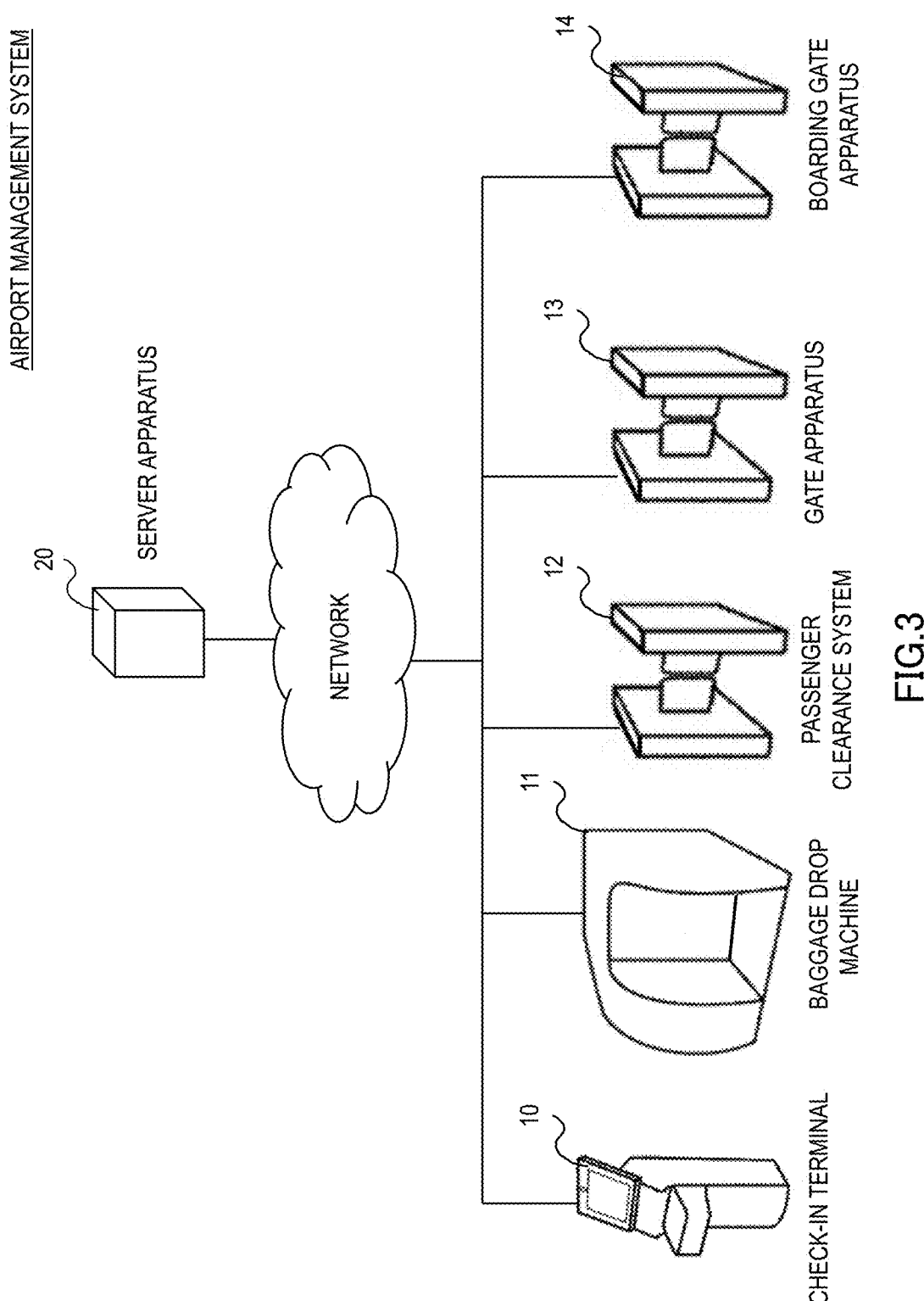
FIG. 3 is a diagram illustrating an example of a schematic configuration of an airport management system according to a first example embodiment.

A first example embodiment will be described in more detail with reference to drawings.
[System Configuration]
FIG. 3 is a diagram illustrating an example of a schematic configuration of an airport management system (information processing system) according to the first example embodiment. The airport management system shown in FIG. 3 is operated, for example, by a public organization such as an immigration bureau, or a contractor who is commissioned by the public organization to perform business. For example, the airport management system manages a series of procedures (baggage check-in, security check, and so on) at an airport.

Referring to FIG. 3, the airport management system includes a check-in terminal 10, a baggage drop machine 11, a passenger clearance system 12, a gate apparatus 13, a boarding gate apparatus 14, and a server apparatus 20.

The baggage drop machine 11, the passenger clearance system 12, the gate apparatus 13, and the boarding gate apparatus 14 are authentication terminals (touch points) installed at the airport. The authentication terminals and the check-in terminal 10 are connected to the server apparatus 20 via a network. The network shown in FIG. 3 consists of a LAN (Local Area Network) that includes a premises communication network of the airport, a WAN (Wide Area Network), a mobile communication network, and so on. A connection method is not limited to a wired method and may be a wireless method.

The server apparatus 20 is an apparatus that realizes a main function of the airport management system. The server apparatus 20 is installed in a facility of an airport company or airline company, and so on. Alternatively, the server apparatus 20 may be a server located in a cloud on a network.

Note that the configuration shown in FIG. 3 is an example and is not intended to limit the configuration of the airport management system. The airport management system may include a terminal or the like, which are not shown in the drawings.

[Schematic Operation of System]

Boarding procedure for a user includes check-in, baggage drop-off, security check, emigration inspection, boarding pass verification, and so on.

The user (passenger) can proceed through the above boarding procedure using biometric authentication or using an existing method that does not use the biometric authentication. When the boarding procedure is performed using the biometric authentication, the above-mentioned series of boarding procedures is carried out sequentially at terminals installed at five locations.

The check-in terminal 10 is installed at a check-in lobby in the airport. The check-in terminal 10 is also a self-service terminal for a check-in procedure through operation by the user. The check-in terminal 10 is also referred to as a CUSS (Common Use Self Service) terminal.

When a user (passenger) arrives at the airport, the user operates the check-in terminal 10 and performs a "check-in procedure". The user presents a paper airline ticket, a two-dimensional barcode which describes boarding information, a mobile terminal which displays a copy of the e-ticket, and the like to the check-in terminal 10. The check-in terminal 10 outputs a boarding pass when the check-in procedure is completed. Note that the boarding pass includes both a paper boarding pass and an electronic boarding pass.

The user who has completed the check-in procedure and wishes to proceed with boarding procedure using biometric authentication performs system registration using the check-in terminal 10. Specifically, the user reads the issued boarding pass and a passport into the check-in terminal 10. The check-in terminal 10 also acquires biometric information of the user. Note that the user who can perform system registration is limited to a user who possesses a passport that complies with a predetermined standard.

Note that examples of the biometric information include data (feature values) calculated from physical features unique to an individual, such as a face, a fingerprint, a voiceprint, a vein, a retina, or an iris pattern of an eye. Alternatively, the biometric information may be image data such as a face image, a fingerprint image, and so on. The biometric information may be anything that includes physical characteristics of a user as information. In the present application, a case in which biometric information about a "face" of a person (a face image or a feature value generated from the face image) is used will be described.

Figure 4:
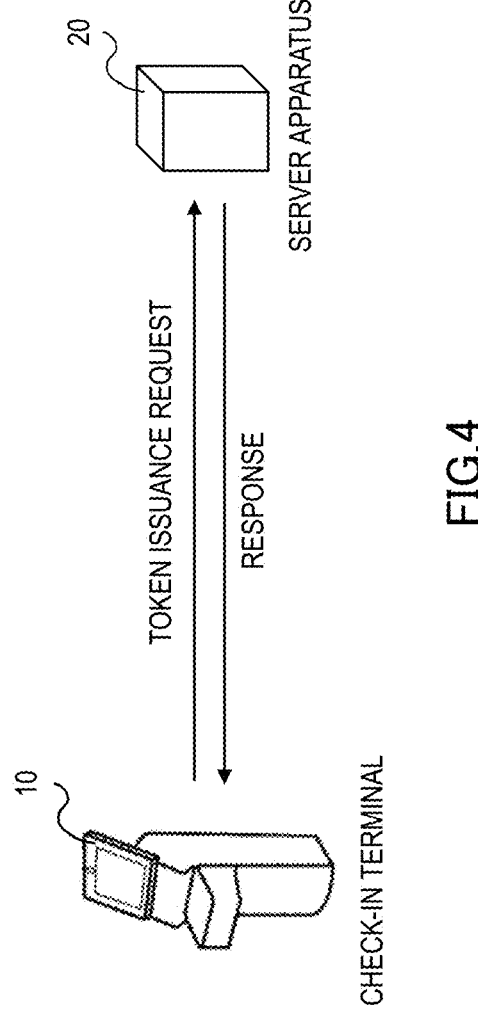
FIG. 4 is a diagram illustrating an operation of the airport management system according to the first example embodiment.

The check-in terminal 10 transmits information regarding the boarding pass, passport, and biometric information to the server apparatus 20. Specifically, the check-in terminal 10 transmits a "token issuance request" that includes information described in the boarding pass (boarding pass information), information described in the passport (passport information), and the biometric information (for example, a face image) to the server apparatus 20 (see FIG. 4).

The server apparatus 20 performs an identity verification using the biometric information described in the passport and the biometric information acquired by the check-in terminal 10. The server apparatus 20 determines whether a face image recorded on the passport and a face image captured by the check-in terminal 10 substantially match.

The server apparatus 20 determines that the identity verification of the user who presented his or her passport to the check-in terminal 10 is successful when the two face images (biometric information) substantially match.

When the identity verification is successful, the server apparatus 20 performs system registration for the user to proceed with the procedure using biometric authentication. Specifically, the server apparatus 20 issues a token to be used for the boarding procedures for the user whose identity verification has been completed.

The issued token is identified by a token ID (Identifier). Information necessary for the boarding procedure (for example, biometric information, operation information necessary for the boarding procedure, and so on) is associated with each other via the token ID. In other words, the "token ID" is issued with system registration of the user and is identification information for the user to undergo the boarding procedure using biometric information. Once the token (token ID) is issued, the user of the system can use the boarding procedure using biometric authentication.

In response to the issuance of the token, the server apparatus 20 adds an entry to a registered person information database that stores detailed information about the token that the server apparatus 20 generated. Details of the registered person information database will be described below.

When the identity verification fails, the server apparatus 20 refuses (rejects) the issuance of the token from the check-in terminal 10.

Once the token is issued (once the user has completed the system registration to proceed using biometric authentication), the user can proceed with the boarding procedure on his/her own (without assistance of an airport staff member, or the like) using the authentication terminal (for example, the baggage drop machine 11, and so on).

Note that users who wish to proceed with conventional boarding procedure that does not require biometric authentication may check-in using the check-in terminal 10, or may check-in at a counter where an airline staff member or the like is waiting.

After the user has completed the check-in procedure, the user moves to a baggage drop-off area or a security checkpoint.

In the following descriptions, a user who has been registered in the system for performing boarding procedure using biometric authentication will be referred to as a "registered person in system" or simply as a "registered person". Additionally, a user who has not been registered in the system for performing boarding procedure using biometric authentication will be referred to as a "non-registered person in system" or simply "non-registered person".

A user who has completed the check-in procedure (registered person in system or non-registered person in system) checks his or her baggage, which cannot be carried on board, at the baggage drop-off area.

The registered person uses the baggage drop machine 11 to check in his or her baggage. The baggage drop machine 11 is installed in an area adjacent to a baggage counter (manned counter) in the airport or in the vicinity of the check-in terminal 10. The baggage drop machine 11 is a self-service terminal for the registered person to check in baggage that will not be carried on an aircraft (baggage check-in procedure). The baggage drop machine 11 is also referred to as a CUBD (Common Use Bag Drop) terminal. After the registered person has completed the baggage check-in procedure, the registered person moves to the security checkpoint.

The non-registered person checks his or her baggage with an airline staff member or the like. After the non-registered person has completed the baggage check-in procedures, the non-registered person moves to the security checkpoint. Note that when the user (registered person or non-registered person) does not check baggage, the baggage check-in procedure is omitted A user (registered person in system or non-registered person in system) undergoes a security check at the passenger clearance system 12 installed at the security checkpoint.

The passenger clearance system 12 is a gate apparatus installed at an entrance of the security checkpoint in the airport. The passenger clearance system 12, also referred to as the PRS (passenger clearance system), is a system that determines whether or not the user can pass through the security checkpoint at the entrance of the security checkpoint. After the user has completed the security check procedure by passing through the passenger clearance system 12, the user moves to an emigration inspection area.

The registered person who has passed the security check without any problem can pass directly through the gate apparatus installed at the security checkpoint. On the other hand, the non-registered person is required to present his or her boarding pass and so on to a security inspector even if there is no problem with the result of the security check.

A user (registered person in system or non-registered person in system) undergoes emigration inspection at the departure inspection area.

The registered person undergoes emigration examination at the gate apparatus 13. The gate apparatus 13 is installed at the emigration examination area in the airport. The gate apparatus 13 is an apparatus that automatically performs an emigration examination procedure for the registered person. After the registered person has completed the emigration examination procedure, the registered person moves to a departure area where a duty-free store and boarding gate are located.

The non-registered person undergoes the emigration examination by an emigration and immigration inspector. After the non-registered person has completed the emigration examination procedure, the non-registered person moves to the departure area.

The user (registered person in system or non-registered person in system) moves through the boarding gate apparatus 14 installed in the departure area and moves to a boarding gate.

The registered person passes through the boarding gate apparatus 14 where no airline staff member is waiting nearby. The non-registered person passes through the boarding gate apparatus 14 where an airline staff member is waiting nearby.

The boarding gate apparatus 14 that controls passage of the registered person determines whether or not the registered person can board the aircraft. When the boarding gate apparatus 14 determines that the registered person can board the aircraft, the boarding gate apparatus 14 opens a gate and permits the registered person to pass through the gate.

The non-registered person hands over the passport and the boarding pass in his or her possession to the staff member waiting near boarding gate apparatus 14. The staff member performs identity verification using the passport, and when the identity verification is successful, the boarding pass is loaded into the boarding gate apparatus 14. When the boarding gate apparatus 14 determines that the non-registered person can board the aircraft using information acquired from the boarding pass, the boarding gate apparatus 14 opens the gate and permits the non-registered person to pass through.

Figure 5:
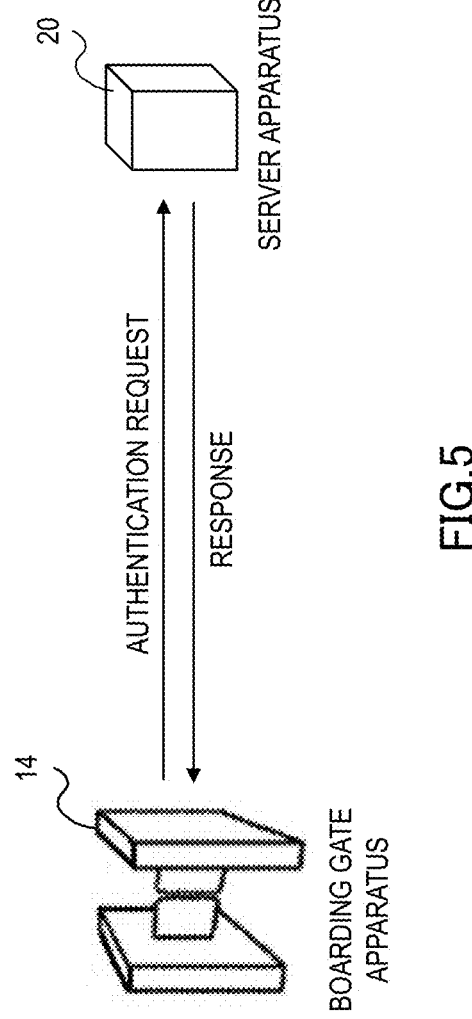
FIG. 5 is a diagram illustrating an operation of the airport management system according to the first example embodiment.

Note that when the registered person in system who has been issued a token arrives at the authentication terminal (for example, the boarding gate apparatus 14), biometric information (for example, a face image) is acquired at the authentication terminal. The authentication terminal transmits an authentication request that includes the biometric information to the server apparatus 20 (see FIG. 5).

The server apparatus 20 identifies the token (entry) by performing a matching processing (1-to-N matching; N is a positive integer, and the same applies to the following description) using the biometric information acquired from the authentication terminal and the biometric information registered in the system. The boarding procedures for the user is carried out based on operation information associated with the identified token. For example, the server apparatus 20 transmits boarding pass information of the user identified by the matching process to the boarding gate apparatus 14.

The boarding gate apparatus 14 determines whether or not the user (registered person in system) is permitted to pass through based on the received boarding pass information. Specifically, the boarding gate apparatus 14 determines whether or not the user is permitted to pass through based on whether or not the airline code and flight number set by the staff member, or the like in own apparatus and an airline code and flight number in the boarding pass information acquired from the server apparatus 20 match or not. When the airline code, and so on match, the user is permitted to pass through, and when the airline code, and so on do not match, the user is rejected to pass through.

As described above, the registered person in system (the user who proceeds with the procedure using biometric authentication) can proceed with the procedure independently at each procedure area such as baggage drop-off area, security checkpoint, emigration inspection area, and departure area. On the other hand, the non-registered person in system (the user who proceeds with the procedure without using biometric authentication) proceeds with the procedure with the staff member, security inspector, emigration and immigration inspector, or the like waiting at each procedure area such as baggage drop-off area, security checkpoint, emigration inspection area, and departure area.

Since passengers using the airport include both registered persons in system and non-registered persons in system, it is necessary to install apparatuses (terminals, facilities) for the registered persons in system and apparatuses for the non-registered persons in system at each procedure area, such as emigration inspection area and departure area. Furthermore, the user (registered person or non-registered person) needs to use the apparatus that corresponds to the method the user has selected (procedure using biometric authentication or procedure without using biometric authentication).

For example, in the departure area, the registered person can pass through the boarding gate apparatus 14 using biometric authentication and therefore needs to go to the boarding gate apparatus 14 where no staff member is waiting. More specifically, the registered person needs to line up in a lane of the boarding gate apparatus 14 that is compatible with biometric authentication.

On the other hand, the non-registered person cannot pass through the boarding gate apparatus 14 using biometric authentication and therefore needs to go to the boarding gate apparatus 14 where a staff member is waiting. More specifically, the non-registered person needs to line up in the lane of the boarding gate apparatus 14 that is not compatible with biometric authentication.

The above situation will be described in more detail with reference to FIG. 6.

Figure 6:
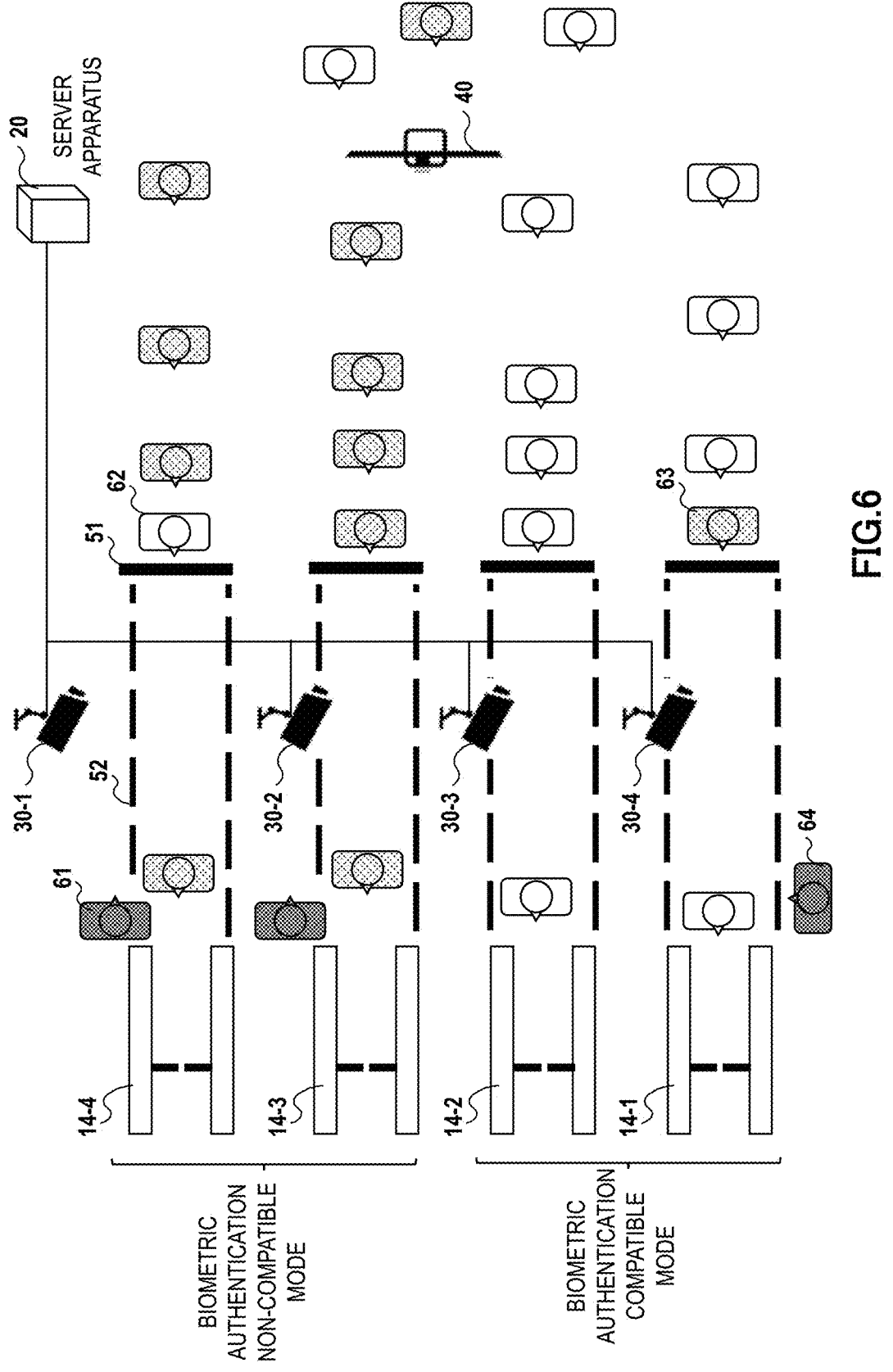
FIG. 6 is a diagram illustrating an operation of the airport management system according to the first example embodiment.

As shown in FIG. 6, users (registered person in system and non-registered person in system) move to the departure area where a plurality of the boarding gate apparatuses 14 are installed.

Each boarding gate apparatus 14 is configured to have a switchable mode of operation, and each has a fixed initial mode. The mode of operation of the boarding gate apparatus 14 includes a "biometric authentication compatible mode" that supports biometric authentication and a "biometric authentication non-compatible mode" that does not support biometric authentication.

In the example in FIG. 6, the initial mode of boarding gate apparatuses 14-1 and 14-2 is "biometric authentication compatible mode". The initial mode of boarding gate apparatuses 14-3 and 14-4 is "biometric authentication non-compatible mode". In this way, the boarding gate apparatus 14 is an authentication terminal that can operate in different modes of operation that are compatible with each of different procedure methods (procedure using biometric authentication, procedure using a method other than biometric authentication).

A display device 40, such as a liquid crystal display, is installed near an entrance to the departure area. The display device 40 performs a display to users who have moved to the departure area so that each user can line up in the correct lane. For example, the display device 40 displays a message as shown in FIG. 7.

Following the message displayed on display device 40, the user lines up in the lane of the boarding gate apparatus 14 that corresponds to the procedure method (procedure using biometric authentication or procedure without using biometric authentication) that he or she has selected. In the example in FIG. 6, the registered persons in system (the persons in white) line up in the lower lane (the lane on the left side from the user's perspective). The non-registered persons in system (the persons in light gray) line up in the upper lane (the lane on the right side from the user's perspective).

A stop line 51 is drawn in front of each boarding gate apparatus 14. The users wait in front of the stop line 51 until the previous user finishes the procedure. When the previous user has completed the procedure, the user who has been waiting goes to the boarding gate apparatus 14 installed in front of him or her and completes the procedure.

For example, the registered person in system goes to the boarding gate apparatus 14-1, which is set to the biometric authentication compatible mode. The boarding gate apparatus 14-1 acquires biometric information of the user in front of the boarding gate apparatus 14-1 and transmits an authentication request including the acquired biometric information to the server apparatus 20.

When the authentication is successful, the server apparatus 20 transmits boarding pass information of the user to the boarding gate apparatus 14-1. Based on the boarding pass information acquired, the boarding gate apparatus 14-1 determines whether or not the user is eligible to board the aircraft. When the user is eligible to board the aircraft, the boarding gate apparatus 14-1 opens the gate and permits the user (person to be authenticated) to pass through.

Meanwhile, the non-registered person in system goes to the boarding gate apparatus 14-4, which is set to the biometric authentication non-compatible mode. The user hands over his or her passport and boarding ticket to an airline staff member 61 (a person in dark gray) who is waiting near the boarding gate apparatus 14-4. The staff member 61 performs identity verification by comparing a photo in the passport with the face of the user in front of the staff member 61.

When the identity verification is successful, the staff member 61 has the boarding pass handed over by the user read by the boarding gate apparatus 14-4. Based on the information in the boarding pass that has been read, the boarding gate apparatus 14-4 determines whether or not the user is eligible to board the aircraft. When the user is eligible to board the aircraft, the boarding gate apparatus 14-4 opens the gate and permits the user to pass through.

As shown in FIG. 6, a fence 52 is installed between each of the boarding gate apparatuses 14 and the stop line 51, and the users who line up in front of the stop line 51 cannot move to other lanes.

As described above, the users (registered person in system or non-registered person in system) who have moved to the departure area walk toward the boarding gate apparatuses 14 from the right side of the drawing. At that time, the users need to line up in the lanes of boarding gate apparatuses 14 corresponding to the method the users have selected (procedure using biometric authentication or procedure without using biometric authentication).

At that time, users who are clearly aware of the method the users have selected grasp the lanes in which the users will line up. However, some users who are not clearly aware of the method they have selected are included.

For example, in FIG. 6, the registered person in system in white needs to line up in front of the boarding gate apparatus 14-1 or 14-2, which are set to the biometric authentication compatible mode. However, a user 62 is lined up in front of the boarding gate apparatus 14-4, which is set to the biometric authentication non-compatible mode. In addition, the non-registered person in system in light gray needs to line up in front of the boarding gate apparatus 14-3 or 14-4, which is set to the biometric authentication non-compatible mode. However, a user 63 is in line in front of the boarding gate apparatus 14-1, which is set to the biometric authentication compatible mode.

If each user does not line up in the correct boarding gate apparatus 14 (the boarding gate apparatus 14 corresponding to the method selected by the user), a user who lines up in the wrong lane will not be able to pass through the boarding gate apparatus 14, thus impeding smooth procedure.

Specifically, the airline staff member has to explain to the user who cannot pass through the boarding gate apparatus 14 the reason why the user cannot pass through the gate, and ask the user to line up again in the correct lane after the user agrees with the reason, and so on. When such handling by the airline staff occurs, the throughput of the boarding gate apparatuses 14 (especially the throughput of the boarding gate apparatus 14-1 and boarding gate apparatus 14-2, which are compatible with biometric authentication and allow the users to walk through) is decreased.

Therefore, the server apparatus 20 determines a type of user waiting for his or her turn in each lane (a waiting person waiting in the front row), and temporarily switches the mode of operation of the boarding gate apparatus 14 when the person waiting is in the wrong lane.

To realize the switching of mode of operation of the boarding gate apparatus 14, camera devices 30-1 through 30-4 that correspond to each boarding gate apparatus 14 are installed. Each camera device 30 is installed on a ceiling or the like in the departure area, and is installed so that the camera device can capture an image of the user in the lane of the corresponding boarding gate apparatus 14, in particular, the user who is standing still at the stop line 51.

Each camera device 30 captures images of the vicinity of the stop line 51 periodically or at a predetermined timing, and acquires image data. The camera device 30 transmits the acquired image data and a camera ID set for own device to the server apparatus 20.

The camera ID is an ID to identify the camera device 30 installed in the departure area. A MAC (Media Access Control) address or IP (Internet Protocol) address of the camera device 30 can be used for the camera ID.

The server apparatus 20 determines whether the user is the registered person in system or the non-registered person in system by using biometric information of the user that appears in the image data.

In addition, when the result of determination reveals that the user lines up in the wrong lane, the server apparatus 20 changes the mode of operation of the boarding gate apparatus 14 in which the user is lined up.

In the example in FIG. 6 above, since the user 62 lines up in the wrong lane (in front of the boarding gate apparatus 14-4, which is set to the biometric authentication non-compatible mode), the server apparatus 20 instructs the boarding gate apparatus 14-4 to temporarily change its mode of operation to the "biometric authentication compatible mode".

In response to the instruction from the server apparatus 20, the boarding gate apparatus 14-4 temporarily sets the mode of operation to the "the biometric authentication compatible mode" and controls passage regarding the user 62. When the user 62 is eligible to board the aircraft, the gate opens at the timing when the user 62 arrives in front of the boarding gate apparatus 14-4, and the user 62 can pass through the gate without handing over his or her passport, and the like, to the staff member.

When the user 63 shown in FIG. 6 stands in front of the stop line 51, the server apparatus 20 grasps that the user 63 is the non-registered person in system based on the image data received from the camera device 30-4. Since the user 63 lines up in the wrong lane (the lane of the boarding gate apparatus 14-1, which is set to the biometric authentication compatible mode), the server apparatus 20 instructs the boarding gate apparatus 14-1 to temporarily change its mode of operation to the "biometric authentication non-compatible mode".

Even if the user 63 arrives in front of the boarding gate apparatus 14-1, the gate does not open because the user 63 is the non-registered person in system. After a staff member 64 (a staff member waiting in the vicinity of the boarding gate apparatuses 14-1 and 14-2) confirms that the gate does not open, the staff member 64 goes to the boarding gate apparatus 14-1. The staff member 64 receives the passport from the user 63 and performs identity verification. When the identity verification is successful, the staff member 64 reads the boarding pass into the boarding gate apparatus 14-1.

The boarding gate apparatus 14-1 determines whether or not the user 63 is permitted to pass through based on information on the acquired boarding pass.

Next, details of the individual apparatuses included in the airport management system according to the first example embodiment will be described.

[Check-In Terminal]

As described above, the check-in terminal 10 is an apparatus that provides operations regarding the check-in procedure and the system registration to a user of the system.

Figure 8:
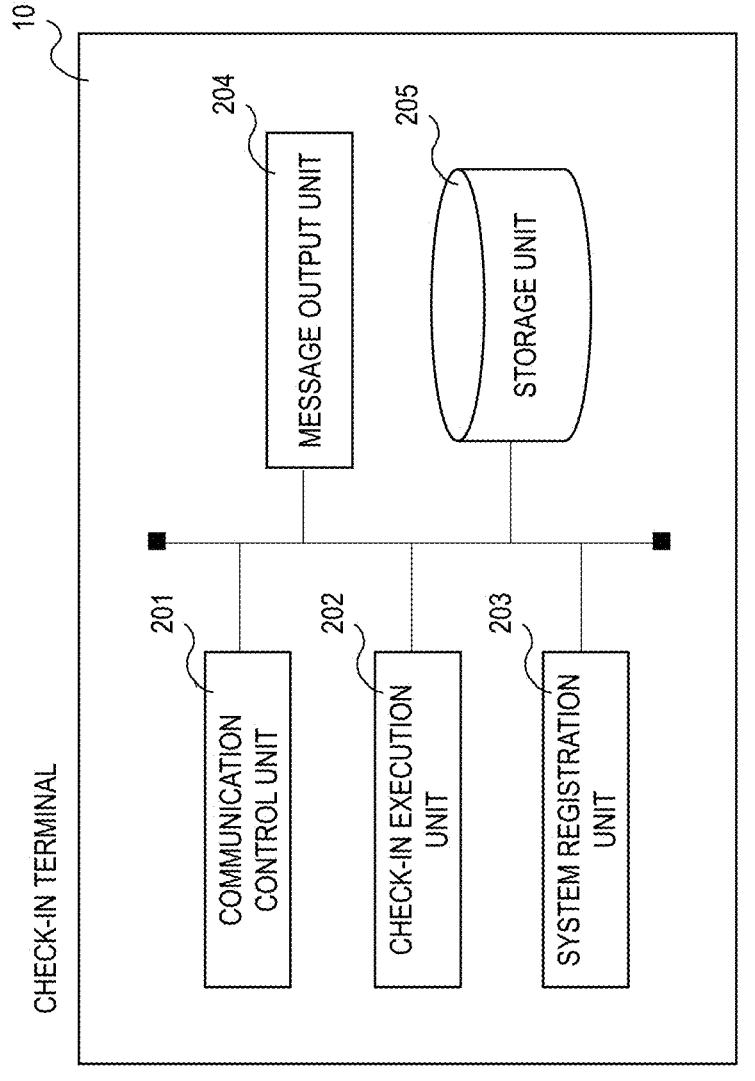
FIG. 8 is a diagram illustrating an example of a processing configuration of a check-in terminal according to the first example embodiment.

FIG. 8 is a diagram illustrating an example of a processing configuration (processing modules) of the check-in terminal 10 according to the first example embodiment. Referring to FIG. 8, the check-in terminal 10 includes a communication control unit 201, a check-in execution unit 202, a system registration unit 203, a message output unit 204, and a storage unit 205.

The communication control unit 201 is means for controlling communication with other apparatuses. For example, the communication control unit 201 receives data (packets) from the server apparatus 20. In addition, the communication control unit 201 transmits data to the server apparatus 20. The communication control unit 201 gives data received from other apparatuses to other processing modules. The communication control unit 201 transmits data acquired from other processing modules to other apparatuses. In this way, other processing modules transmit and receive data to and from other apparatuses via the communication control unit 201. The communication control unit 201 includes a function as a receiving unit that receives data from other apparatuses and a function as a transmitting unit that transmits data to other apparatuses.

The check-in execution unit 202 is means for performing the check-in procedure for a user. The check-in execution unit 202 executes the check-in procedure such as seat selection, and so on based on an airline ticket presented by the user. For example, the check-in execution unit 202 transmits information described on the airline ticket to a DCS (Departure Control System) and acquires information to be described on boarding pass from the DCS. Note that an operation of the check-in execution unit 202 can be the same as that of an existing check-in terminal, so a more detailed explanation will be omitted.

The system registration unit 203 is means for performing system registration of a user who wishes to undergo the boarding procedure using biometric authentication. For example, the system registration unit 203 displays a GUI (Graphical User Interface) to confirm whether or not the user wishes to use the "boarding procedure using a face image" after the check-in procedure is completed.

When a user wishes to register with the system, the system registration unit 203 acquires the three pieces of information (boarding pass information, passport information, and biometric information) using a GUI for acquiring the three pieces of information. The system registration unit 203 acquires the boarding pass information and passport information from the boarding pass and passport held by the user. The system registration unit 203 controls a reader such as a scanner (not shown) and acquires the information described on the boarding pass (boarding pass information) and the information described on the passport (passport information).

The boarding pass information includes name (first name, last name), airline code, flight number, boarding date, place of departure (boarding airport), destination (arrival airport), seat number, boarding time, arrival time, and so on. The passport information includes passport face image, name, gender, nationality, passport number, passport issuing country, and so on.

Moreover, the system registration unit 203 acquires biometric information of a user. The system registration unit 203 controls a camera and acquires the face image of the user. For example, when the system registration unit 203 detects a face in the image that is constantly or periodically captured, the system registration unit 203 captures the face of the user and acquires the face image of the user.

After that, the system registration unit 203 generates a token issuance request that includes the acquired three pieces of information (boarding pass information, passport information, and biometric information).

For example, the system registration unit 203 generates the token issuance request that includes an identifier of the own device (hereinafter referred to as "terminal ID"), the boarding pass information, the passport information, and the biometric information. Note that a MAC (Media Access Control) address or an IP (Internet Protocol) address of the check-in terminal 10 can be used as the terminal ID. The system registration unit 203 transmits the generated token issuance request to the server apparatus 20.

The system registration unit 203 hands over the response acquired from the server apparatus 20 (response to the token issuance request) to the message output unit 204.

The message output unit 204 is means for outputting various messages. For example, the message output unit 204 outputs a message in accordance with the response acquired from the server apparatus 20.

When the message output unit 204 receives a response (positive response) that the token has been successfully issued, the message output unit 204 outputs a message to that effect. For example, the message output unit 204 outputs a message such as "Future procedures can be performed using face recognition".

When the message output unit 204 receives a response (negative response) that the token has failed to be issued, the message output unit 204 outputs a message to that effect. For example, the message output unit 204 outputs a message "We are sorry. You cannot proceed with the procedure using face recognition. Please head to a manned booth."

The storage unit 205 is means for storing information necessary for the operation of the check-in terminal 10.

[Boarding Gate Apparatus]

The boarding gate apparatus 14 is one form of the authentication terminal that can switch between the biometric authentication compatible mode which supports biometric authentication and the biometric authentication non-compatible mode which supports a method other than the biometric authentication. The boarding gate apparatus 14 operates in either the biometric authentication compatible mode or the biometric authentication non-compatible mode as its initial mode of operation.

Figure 9:
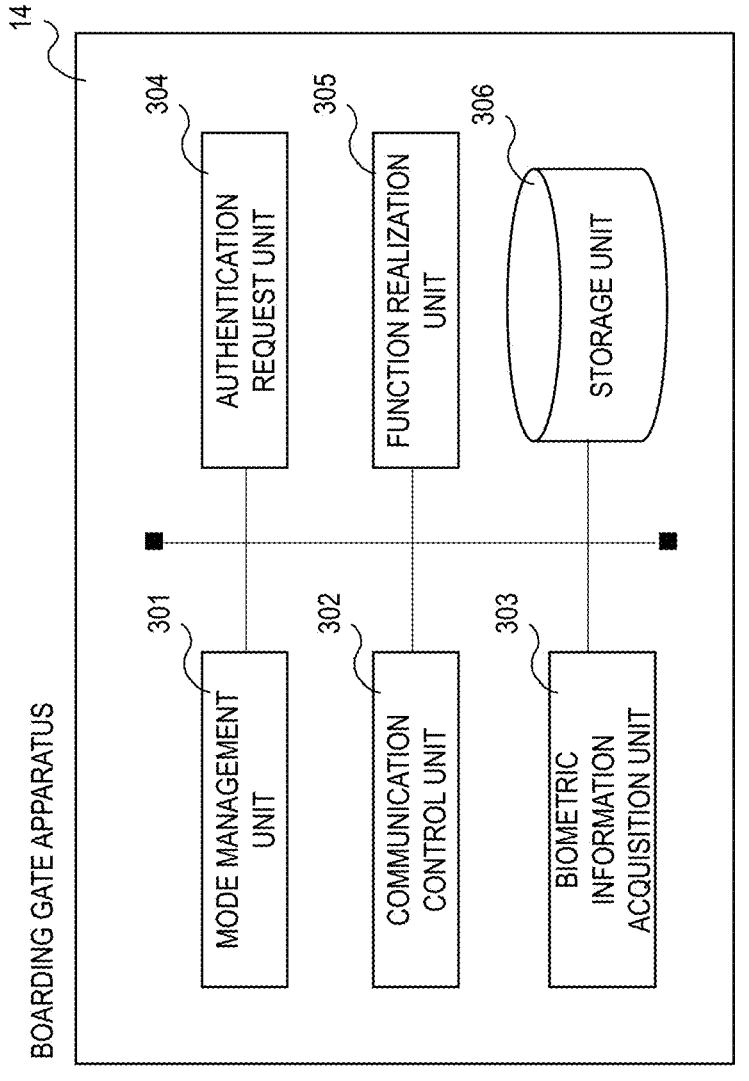
FIG. 9 is a diagram illustrating an example of a processing configuration of a boarding gate apparatus according to the first example embodiment.

FIG. 9 is a diagram illustrating an example of a processing configuration (processing modules) of the boarding gate apparatus 14 according to the first example embodiment. Referring to FIG. 9, the boarding gate apparatus 14 includes a mode management unit 301, a communication control unit 302, a biometric information acquisition unit 303, an authentication request unit 304, a function realization unit 305, and a storage unit 306.

The mode management unit 301 is means for controlling a mode of operation of the boarding gate apparatus 14. The mode management unit 301 acquires the initial mode (biometric authentication compatible mode, biometric authentication non-compatible mode, or power off mode) in accordance with a status of a switch attached to the boarding gate apparatus 14. Alternatively, the mode management unit 301 may acquire the initial mode using a GUI (Graphical User Interface) displayed on a liquid crystal panel or the like.

In the example in FIG. 6, the biometric authentication compatible mode is set as an initial mode for the boarding gate apparatuses 14-1 and 14-2. The biometric authentication non-compatible mode is set as the initial mode for the boarding gate apparatuses 14-3 and 14-4.

The mode management unit 301 receives an "instruction to change mode of operation" from the server apparatus 20. The mode management unit 301 temporarily switches the mode of operation from the initial mode to another mode of operation in response to receiving the instruction to change mode of operation.

The mode management unit 301 receives an "instruction to return mode of operation" from the function realization unit 305. When the mode management unit 301 receives the instruction to return mode of operation, the mode management unit 301 returns the mode of operation that had been temporarily changed to the initial mode.

The mode management unit 301 stores the initial mode and a current mode of operation set for own apparatus in the storage unit 306.

Next, an operation of the boarding gate apparatus 14 in each mode of operation will be described. First, each module of the boarding gate apparatus 14 set to the biometric authentication compatible mode is described.

The communication control unit 302 is means for controlling communication with other apparatuses. For example, the communication control unit 302 receives data (packets) from the server apparatus 20. In addition, the communication control unit 302 transmits data to the server apparatus 20. The communication control unit 302 gives data received from other apparatuses to other processing modules. The communication control unit 302 transmits data acquired from other processing modules to other apparatuses. In this way, other processing modules transmit and receive data to and from other apparatuses via the communication control unit 302. The communication control unit 302 includes a function as a receiving unit that receives data from other apparatuses and a function as a transmitting unit that transmits data to other apparatuses.

The biometric information acquisition unit 303 is means for controlling a camera (not shown) and acquiring biometric information of a user (person to be authenticated). The biometric information acquisition unit 303 captures an image in front of own apparatus periodically or at predetermined timing. The biometric information acquisition unit 303 determines whether or not the acquired image includes a human face image, and when the face image is included, extracts the face image from the acquired image data.

An existing technique can be used for the face image detection and extraction processing performed by the biometric information acquisition unit 303, and therefore, detailed description thereof will be omitted. For example, the biometric information acquisition unit 303 may extract a face image (a face area) from the image data by using a learning model learned by a CNN (Convolutional Neural Network). Alternatively, the biometric information acquisition unit 303 may extract a face image by using a technique such as template matching.

The biometric information acquisition unit 303 gives the extracted face image to the authentication request unit 304.

The authentication request unit 304 is means for requesting the server apparatus 20 for an authentication regarding the user in front. The authentication request unit 304 generates an authentication request that includes the acquired face image and transmits the authentication request to the server apparatus 20.

The authentication request unit 304 receives a response from the server apparatus 20 to the authentication request.

The authentication request unit 304 hands over the result of authentication (authentication success or authentication failure) acquired from the server apparatus 20 to the function realization unit 305. When the authentication is successful, the authentication request unit 304 also hands over "operation information" acquired from the server apparatus 20 to the function realization unit 305.

The function realization unit 305 is means for realizing a "control of passage of user" function of the boarding gate apparatus 14.

When the result of authentication is "authentication failure", the function realization unit 305 notifies the user (the person who has failed authentication; the person to be authenticated who is determined to have failed in authentication) to that effect. In addition, the function realization unit 305 closes a flapper, gate, and so on, and rejects the user to pass through.

In case of successful authentication, the function realization unit 305 acquires the airline code, flight number, and so on that are described on the boarding pass issued to the user from the operation information (boarding pass information) that the function realization unit 305 has acquired. The function realization unit 305 determines whether the airline code and flight number preset in own apparatus by an airline staff member, or the like, and the airline code and flight number acquired from the server apparatus 20 match or do not match.

When the airline code, and so on, match, the function realization unit 305 permits the user (registered person in system) to pass through the gate. The function realization unit 305 opens the flapper, gate, and so on, and permits the user to pass through.

When the airline code, and so on, do not match, the function realization unit 305 rejects the user to pass through the gate. The function realization unit 305 closes the flapper, gate, and so on, and rejects the user to pass through.

The storage unit 306 is means for storing information necessary for the operation of the boarding gate apparatus 14.

Next, each module of boarding gate apparatus 14 set to biometric authentication non-compatible mode will be described.

In the biometric authentication non-compatible mode, the communication control unit 302, the biometric information acquisition unit 303, and the authentication request unit 304 do not operate. In the biometric authentication non-compatible mode, the function realization unit 305 mainly operates.

The function realization unit 305 in the biometric authentication non-compatible mode controls a card reader and reads information described on the boarding pass. Specifically, the function realization unit 305 reads boarding pass information (airline code, flight number, and so on) from the boarding pass handed over to the airline staff member from the user.

The function realization unit 305 determines whether the airline code described in the read boarding pass matches an airline code and flight number preset in own apparatus by the airline staff member or the like.

When the airline code, and so on, match, the function realization unit 305 permits the user to pass through the gate. The function realization unit 305 opens the flapper, gate, and so on, and permits the user to pass through.

When the airline code, and so on, do not match, the function realization unit 305 rejects the user to pass through the gate. The function realization unit 305 closes the flapper, gate, and so on, and rejects the user to pass through the gate.

Here, when the initial mode of the function realization unit 305 is different from the mode of operation, the function realization unit 305 notifies the mode management unit 301 of the "instruction to return mode of operation" at the timing when the procedure of the user is completed.

Specifically, when the function realization unit 305 permits the user to pass through the gate regardless of the mode of operation (biometric authentication compatible mode or biometric authentication non-compatible mode), the function realization unit 305 outputs the "instruction to return mode of operation" at the timing when the user passes through the gate, and so on. Note that the function realization unit 305 detects the user passing through the gate using a human detection sensor or the like installed in the boarding gate apparatus 14.

Moreover, regardless of the mode of operation (biometric authentication compatible mode or biometric authentication non-compatible mode), the function realization unit 305 outputs the "instruction to return mode of operation" at the timing when the function realization unit 305 rejected the user to pass through the gate.

Note that when the mode of operation of own apparatus is changed, each processing module, including the function realization unit 305, switches the mode of operation at the timing when a series of processing currently being performed is completed. For example, the function realization unit 305 switches the mode of operation at the timing when the series of processing related to the user in front of the function realization unit 305 has been completed.

[Other Authentication Terminals]

Basic processing configuration of the other authentication terminals (the baggage drop machine 11, the passenger clearance system 12, and the gate apparatus 13) included in the airport management system can be the same as the processing configuration of the boarding gate apparatus 14 shown in FIG. 9, so a detailed description will be omitted. Each terminal similarly acquires biometric information (face image) of the person to be authenticated and requests an authentication using the acquired biometric information to the server apparatus 20. When the authentication is successful, the functions assigned to each terminal are executed.

[Server Apparatus]

Figure 10:
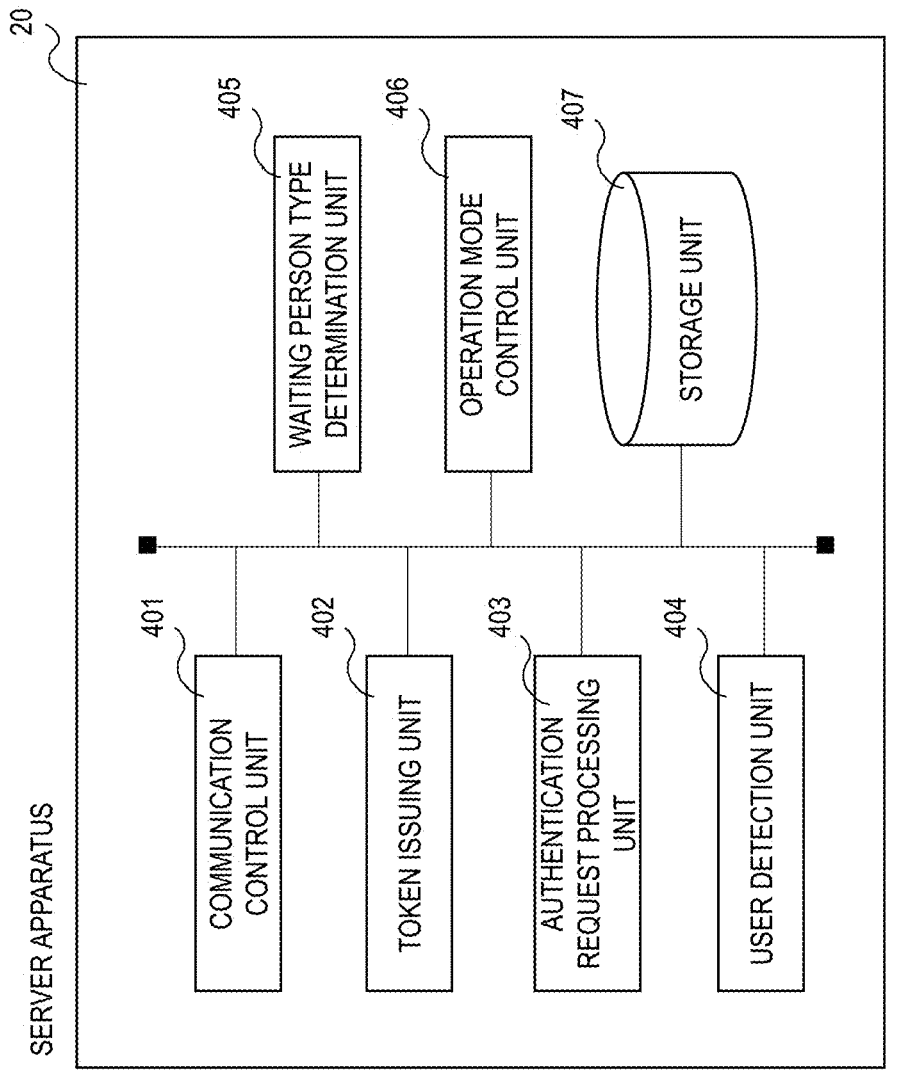
FIG. 10 is a diagram illustrating an example of a processing configuration of a server apparatus according to the first example embodiment.

FIG. 10 is a diagram illustrating an example of a processing configuration (processing modules) of the server apparatus 20 according to the first example embodiment. Referring to FIG. 10, the server apparatus 20 includes a communication control unit 401, a token issuing unit 402, an authentication request processing unit 403, a user detection unit 404, a waiting person type determination unit 405, an operation mode control unit 406, and a storage unit 407.

The communication control unit 401 is means for controlling communication with other apparatuses. For example, the communication control unit 401 receives data (packets) from the check-in terminal 10, and so on. In addition, the communication control unit 401 transmits data to the check-in terminal 10, and so on. The communication control unit 401 gives data received from other apparatuses to other processing modules. The communication control unit 401 transmits data acquired from other processing modules to other apparatuses. In this way, other processing modules transmit and receive data to and from other apparatuses via the communication control unit 401. The communication control unit 401 includes a function as a receiving unit that receives data from other apparatuses and a function as a transmitting unit that transmits data to other apparatuses.

The token issuing unit 402 is means for issuing a token in response to a token issuance request from the check-in terminal 10. The token issuing unit 402 extracts a face image included in the token issuance request (a face image of a user who wishes to register with the system) and a face image included in the passport information. The token issuing unit 402 determines whether or not these two face images substantially match and performs an identity verification.

The token issuing unit 402 performs matching (one-to-one matching) between the above two face images. At that time, the token issuing unit 402 generates a feature value from each of the two images.

Note that since an existing technology can be used to generate the feature values, a detailed description thereof will be omitted. For example, the token issuing unit 402 extracts eyes, nose, mouth, and so on as feature points from the face image. After that, the token issuing unit 402 calculates the location of individual feature point and the distance between individual feature points as a feature value (generate a feature vector consisting of a plurality of feature values).

The token issuing unit 402 calculates the similarity of the two images based on the feature value, and determines whether the two images are face images of the same person or not based on a result of the threshold processing for the calculated similarity. Note that the chi-squared distance, the Euclidean distance, or the like can be used for the individual similarity. A longer distance represents a lower similarity, and a shorter distance represents a higher similarity.

For example, when the similarity is greater than a predetermined value (when the distance is shorter than a predetermined value), the token issuing unit 402 determines that the two face images indicate the same person (determines that the identity verification is successful). When the similarity is less than or equal to the predetermined value, the token issuing unit 402 determines that the two face images do not indicate the same person (determines that the identity verification fails).

When the identity verification is successful, the token issuing unit 402 issues a token. For example, the token issuing unit 402 generates a unique value as a token ID based on the date and time of processing, sequence number, and so on.

When the token issuing unit 402 generates the token (token ID), the token issuing unit 402 transmits a positive response (the token has been successfully issued) to the check-in terminal 10 that is the sender of the token issuance request. When the token issuing unit 402 fails to generate a token ID, the token issuing unit 402 transmits a negative response (the token has failed to be issued) to the check-in terminal 10 that is the sender of the token issuance request.

When the token issuing unit 402 succeeds in generating (issuing) the token ID, token issuing unit 402 registers the generated token ID, boarding pass information, passport information, and biometric information (feature value) in the registered person information database (see FIG. 11). Note that the registered person information database shown in FIG. 11 is an example, and is not intended to limit items to be stored. For example, a "face image" may be registered in the registered person information database as biometric information.

The authentication request processing unit 403 is means for processing an authentication request acquired from each authentication terminal, such as baggage drop machine 11 and boarding gate apparatus 14. The authentication request includes biometric information of the person to be authenticated. The authentication request processing unit 403 performs a matching processing (1-to-N matching; N is a positive integer, and the same applies to the following description) using biometric information included in the authentication request and the biometric information stored in the registered person information database.

The authentication request processing unit 403 generates a feature value from a face image acquired from the authentication terminal. The authentication request processing unit 403 sets the generated feature value (feature vector) as the feature value of matching side and feature value registered in the registered person information database as the feature value of the registration side, respectively.

The authentication request processing unit 403 determines that the matching processing has been successful when there exists a feature value whose similarity between the feature value among the plurality of feature values registered in the registered person information database and the feature value of the target to be matched is greater than a predetermined value.

When the authentication is successful, the authentication request processing unit 403 reads the operation information (passport information, boarding pass information, and so on) of the entry corresponding to the feature value with the highest similarity from the registered person information database.

The authentication request processing unit 403 transmits the result of authentication to the authentication terminal (responds to the authentication request). When the authentication is successful, the authentication request processing unit 403 transmits a positive response that includes that fact (authentication success) and the operation information to the authentication terminal. When the authentication fails, the authentication request processing unit 403 transmits a negative response that includes that fact (authentication failure) to the authentication terminal.

The user detection unit 404 is means for detecting a waiting person waiting at a waiting area using image data acquired by capturing an image of the waiting area to perform a procedure at the boarding gate apparatus 14. More specifically, the user detection unit 404 detects the user (registered person in system or non-registered person in system) waiting to start the procedure at the stop line.

The user detection unit 404 receives image data and a camera ID periodically or at a predetermined timing from the camera device 30 that captures an image in the vicinity of the stop line set in front of the boarding gate apparatus 14. The user detection unit 404 attempts to extract a face image from the acquired image data.

When at least one or more face images are extracted, the user detection unit 404 calculates a distance between eyes from each face image. Specifically, the user detection unit 404 extracts the left and right eyes from the face image and calculates the length (number of pixels) of a straight line connecting the two extracted eyes (outer corners of the eyes).

The user detection unit 404 performs a threshold processing on the distance between the eyes calculated from at least one or more face images extracted from the image data, and extracts (identifies) face images that have the distance between the eyes is longer than a predetermined threshold.

When there is no face image that has the distance between the eyes longer than the threshold, the user detection unit 404 determines that there is no waiting person at the stop line drawn in front of the boarding gate apparatus 14 corresponding to the camera device 30 that transmitted the image data.

When there is at least one or more face images that have the distance between the eyes longer than the predetermined value, the user detection unit 404 determines that the waiting person corresponding to the face image with the longest distance between the eyes is present in front of the stop line.

When the user in front of the stop line (the user corresponding to the face image that has the longest distance between the eyes and the distance between the eyes longer than the threshold) is detected, the user detection unit 404 hands over the detected face image of the user and the camera ID to the waiting person type determination unit 405.

In this way, the user detection unit 404 extracts the face image from the image data and calculates the distance between the eyes from the extracted face image. The user detection unit 404 detects the waiting person based on the calculated distance between the eyes. At that time, when at least one or more face images are extracted from the image data, the user detection unit 404 identifies the face image that has the distance between the eyes longer than the predetermined threshold and the distance between the eyes longest among the at least one or more face images. The user detection unit 404 detects a person corresponding to the identified face image as the waiting person.

The waiting person type determination unit 405 is means for determining a type of the waiting person regarding the procedure to be proceeded with at the boarding gate apparatus 14. More specifically, the waiting person type determination unit 405 determines the type of user (registered person in system, non-registered person in system) who stands in front of the stop line.

The waiting person type determination unit 405 generates a feature value from the acquired face image and performs a matching processing (1-to-N matching) using the generated feature value and a feature value stored in the registered person information database.

When the matching processing is successful (when biometric information that substantially matches biometric information of the waiting person that appears in the image data is registered in the registered person information database), the waiting person type determination unit 405 sets the type of the waiting person to be the "registered person in system".

When the matching processing fails (when biometric information that substantially matches biometric information of the waiting person that appears in the image data is not registered in the registered person information database), the waiting person type determination unit 405 determines the type of the waiting person to be the "non-registered person in system".

When the waiting person type determination unit 405 has completed determining the type of the waiting person, the waiting person type determination unit 405 hands over the result of determination (registered person in system, non-registered person in system) and the camera ID to an operation mode control unit 406.

In this way, the waiting person is determined whether the waiting person is the registered person in system who can proceed with the procedure at the boarding gate apparatus 14 using biometric authentication by registering his or her biometric information with the system, or whether the waiting person is the non-registered person in system who cannot proceed with the procedure using biometric authentication. At that time, the waiting person type determination unit 405 determines whether the waiting person is the registered person in system or the non-registered person in system by a matching processing using the biometric information of the waiting person and the biometric information stored in the registered person information database.

The operation mode control unit 406 is means for controlling a mode of operation of each boarding gate apparatus 14 installed at the departure area. More specifically, the operation mode control unit 406 instructs the boarding gate apparatus 14 to change the mode of operation when the type of the waiting person is not consistent with the mode of operation of the boarding gate apparatus 14.

The operation mode control unit 406 verifies consistency between the mode of operation (initial mode) of the boarding gate apparatus 14 and the type of the waiting person lined up in the lane of the boarding gate apparatus 14 (type of waiting person). When the mode of operation is not consistent with the type of waiting person, the operation mode control unit 406 instructs the boarding gate apparatus 14 to change the mode of operation.

The operation mode control unit 406 uses the camera ID acquired from the waiting person type determination unit 405 and acquires the initial mode of the boarding gate apparatus 14 corresponding to the camera device 30 that has transmitted the image data in which the type of user was determined.

Specifically, the operation mode control unit 406 acquires the above initial mode by referring to a table information that stores such as the camera ID, ID of the boarding gate apparatus 14, and the initial mode of the boarding gate apparatus 14 in association with each other (see FIG. 12). Note that, in FIG. 12, a reference sign of the boarding gate apparatus 14 is used as the ID of the boarding gate apparatus 14 for ease of understanding.

The operation mode control unit 406 transmits an "instruction to change mode of operation" to the boarding gate apparatus 14 based on the result of determination acquired from the waiting person type determination unit 405 (type of waiting person; registered person in system, non-registered person in system) and the initial mode read from the table information.

More specifically, when the type of waiting person is the "registered person in system" and the initial mode is the "biometric authentication non-compatible mode," the operation mode control unit 406 transmits the instruction to change mode of operation to the boarding gate apparatus 14. Alternatively, when the type of waiting person is the "non-registered person in system" and the initial mode is the "biometric authentication compatible mode," the operation mode control unit 406 transmits the instruction to change mode of operation to the boarding gate apparatus 14.

In this way, the operation mode control unit 406 transmits the instruction to change mode of operation when the boarding gate apparatus 14 operates in the biometric authentication compatible mode and the waiting person is the non-registered person in system or when the boarding gate apparatus 14 operates in the biometric authentication non-compatible mode and the waiting person is the above mentioned registered person in system. More specifically, the operation mode control unit 406 temporarily changes the mode of operation of the boarding gate apparatus 14 when the type of waiting person is not consistent with the initial mode of operation of boarding gate apparatus 14. In other words, when a user of a type of waiting person that is different from the type of waiting person corresponding to the initial mode is waiting at the stop line, the operation mode control unit 406 transmits the "instruction to change mode of operation" to the boarding gate apparatus 14 corresponding to the camera device 30 that has captured the processed image data.

Note that the initial mode of each boarding gate apparatus 14 is shared between the server apparatus 20 and each boarding gate apparatus 14 by any method. For example, a system administrator determines the initial mode and sets the determined initial mode in the server apparatus 20. The system administrator also sets the determined initial mode to each boarding gate apparatus 14.

Similarly, the camera ID is shared between the server apparatus 20 and each camera device 30 by any method. For example, the system administrator determines the camera ID and sets the determined camera ID in the server apparatus 20. The system administrator also sets the determined camera ID to each camera device 30.

The storage unit 407 stores various kinds of information necessary for the operation of the server apparatus 20. The registered person information database and target person to be tracked management database are established in the storage unit 407. A passenger information database is a database that stores biometric information of the registered person in system.

Figure 13:
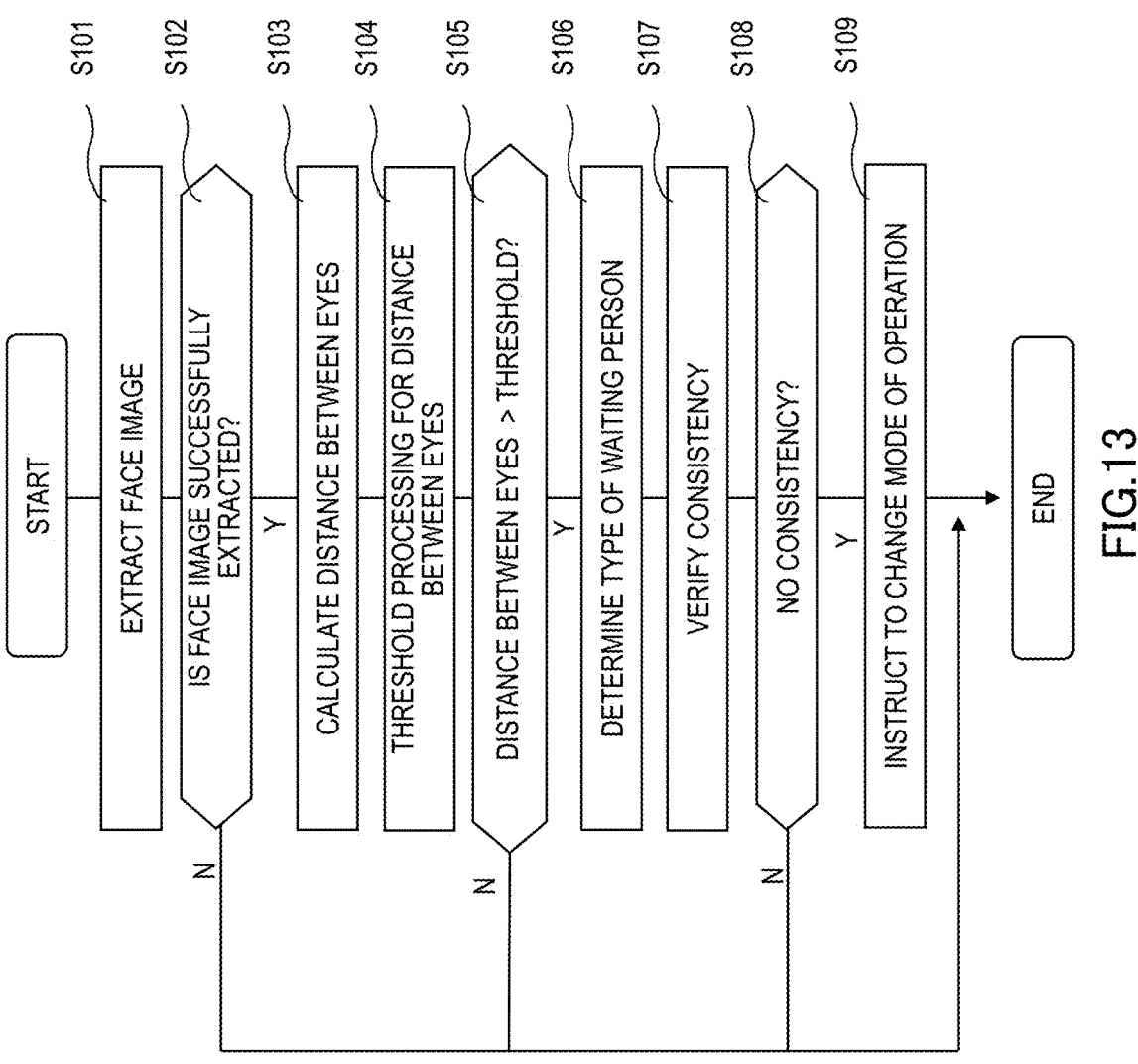
FIG. 13 is a flowchart illustrating an example of an operation of the server apparatus according to the first example embodiment.

FIG. 13 is a flowchart illustrating an example of an operation of the server apparatus 20 according to the first example embodiment. Referring to FIG. 13, an operation of the server apparatus 20 when the server apparatus 20 processes the image data received from the camera device 30 will be described.

When the server apparatus 20 receives image data from the camera device 30, the server apparatus 20 attempts to extract a face image from the image data (step S101).

When no face image is extracted (step S102, No branch), the server apparatus 20 terminates the process.

When at least one or more face images are extracted (step S102, Yes branch), the server apparatus 20 calculates the distance between eyes from each face image (step S103).

The server apparatus 20 determines whether or not there exists a face image that has the calculated distance between the eyes is longer than a predetermined threshold (threshold processing for the distance between the eyes; Step S104).

When there is no face image that has the longer distance between the eyes than the predetermined threshold (Step S105, No branch), the server apparatus 20 terminates the process.

When there exists the face image that has the longer distance between the eyes than the predetermined threshold (Step S105, Yes branch), the server apparatus 20 determines the type of user of the face image that has the longest distance between the eyes (type of waiting person determination; Step S106).

The server apparatus 20 verifies consistency between the mode of operation of the boarding gate apparatus 14 (initial mode) and the type of waiting person (consistency verification; step S107).

When the mode of operation of the boarding gate apparatus 14 is consistent with the type of waiting person (step S108, No branch), the server apparatus 20 terminates the process.

When the mode of operation of the boarding gate apparatus 14 is not consistent with the type of waiting person (step S108, Yes branch), the server apparatus 20 transmits an "instruction to change mode of operation" to the boarding gate apparatus 14 (step S109).

[Camera Device]

A detailed description of the camera device 30 will be omitted. This is because a configuration and an operation of the camera device 30 are obvious to those skilled in the art. The camera device 30 may capture a predetermined area periodically or at a predetermined timing and transmit the acquired image data and the camera ID set by the system administrator to the server apparatus 20.

[System Operation]

Figure 14:
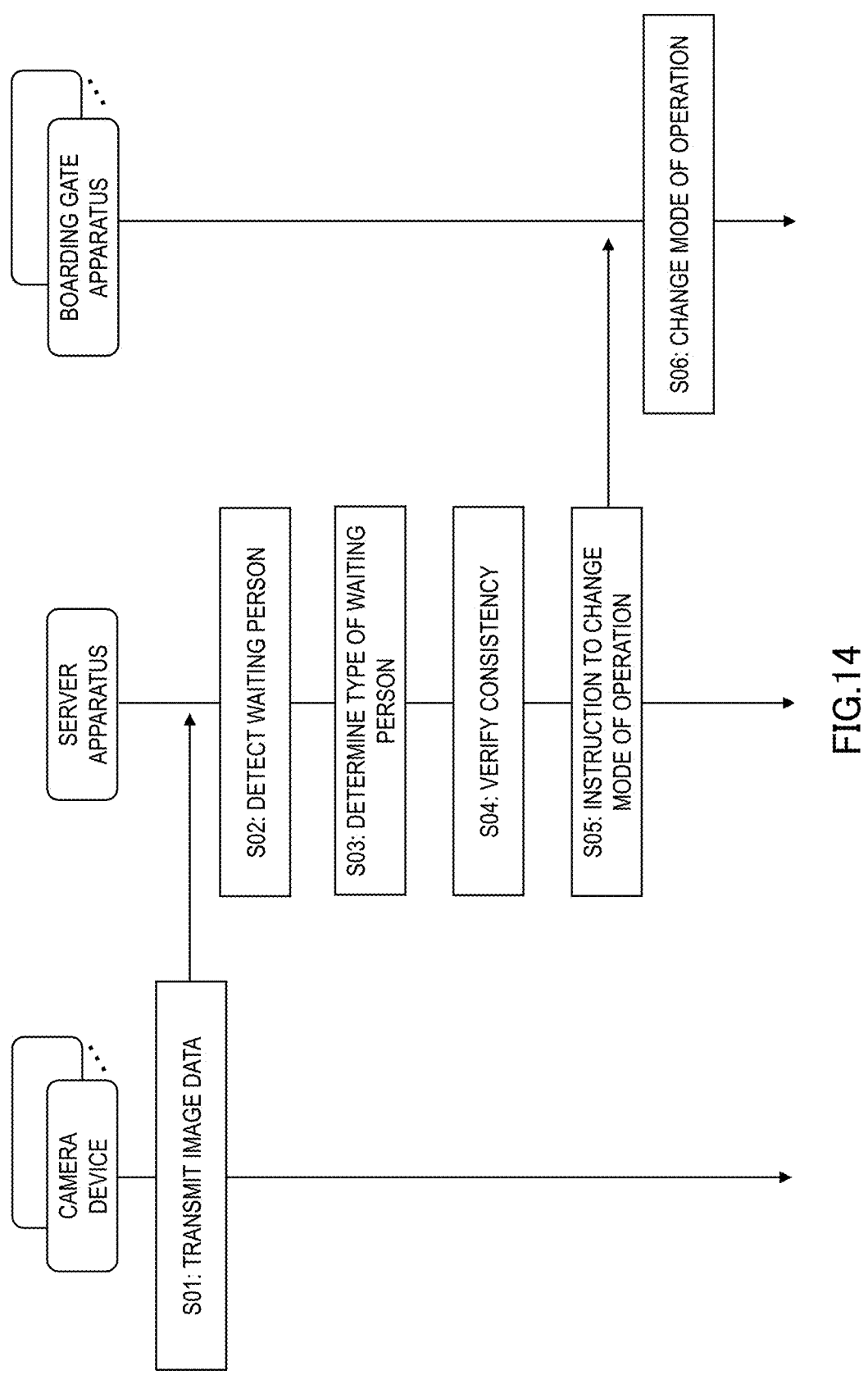
FIG. 14 is a sequence diagram illustrating an example of an operation of the airport management system according to the first example embodiment.

Next, an operation of the airport management system according to the first example embodiment will be described. FIG. 14 is a sequence diagram illustrating an example of the operation of the airport management system according to the first example embodiment. Referring to FIG. 14, an operation when the mode of operation of the boarding gate apparatus 14 is changed will be described.

Each camera device 30 installed at the departure area transmits image data to the server apparatus 20 (step S01).

The server apparatus 20 detects a person who is waiting at the stop line by extracting a face image from the image data and calculating a distance between the eyes from the face image (Step S02).

The server apparatus 20 determines a type of waiting person of the detected user (Step S03).

The server apparatus 20 verifies consistency between a mode of operation of the boarding gate apparatus 14 and the type of waiting person (Step S04).

When the mode of operation of the boarding gate apparatus 14 is not consistent with the type of waiting person, the server apparatus 20 transmits an "instruction to change mode of operation" to the boarding gate apparatus 14 (Step S05).

In response to receiving the instruction to change mode of operation, the boarding gate apparatus 14 changes the mode of operation from the initial mode to another mode (step S06).

As described above, in the airport management system according to the first example embodiment, the camera device 30 captures an image of the waiting person who is waiting for his or her turn to perform the procedure at the authentication terminal. The server apparatus 20 analyzes the image data captured by the camera device 30 and determines the type of the waiting person (registered person in system or non-registered person in system). Furthermore, when the server apparatus 20 determines that the mode of operation of the authentication terminal where the waiting person is lined up is not consistent with the type of waiting person, the server apparatus 20 changes the mode of operation (initial mode) of the authentication terminal so that the procedure of the waiting person can proceed without delay. As a result, since the waiting person can perform the procedure at the authentication terminal that matches the procedure method he or she has selected, the number of procedural failures at the authentication terminal is decreased. Since the number of procedural failures at the authentication terminal in the procedure area is decreased, throughput in the procedure area is improved.

In particular, when a user who has not registered with the system uses the authentication terminal that is required for system registration, convenience for the registered person in system being able to walk through the authentication terminal is lost. Therefore, the airport management system according to the first example embodiment improves the throughput by automatically switching the mode of operation of the authentication terminal to the mode of operation that suits a passenger lined up in the lane.

Second Example Embodiment

Next, a second example embodiment will be described in detail with reference to drawings.

Here, it is a general rule for procedures in the airport that when there is already a user who is going through a procedure at the authentication terminal (the boarding gate apparatus 14), the next user waits in front of the stop line until the user completes the procedure.

As long as this general rule is observed, the throughput of the procedure area can be maintained by changing the mode of operation of the boarding gate apparatus 14 according to the type of user (registered person in system or non-registered person in system) who has lined up in the wrong lane.

Figure 15:
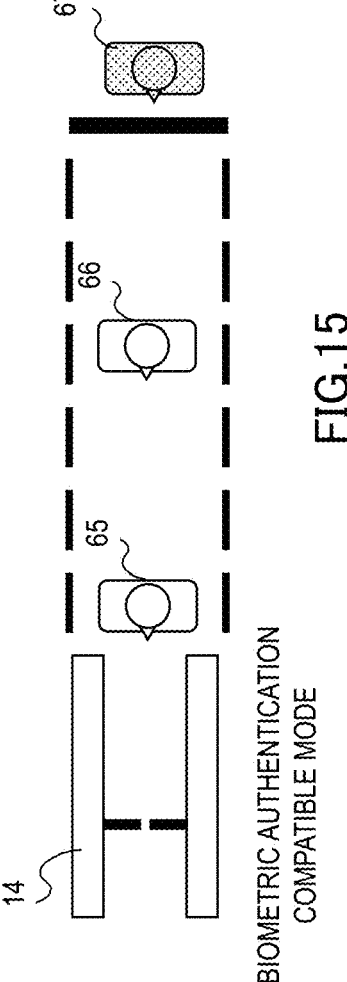
FIG. 15 is a diagram illustrating an operation of the airport management system according to a second example embodiment.

However, when an irregular situation occurs, as is illustrated in FIG. 15, it may not be possible to correctly change the mode of operation of the boarding gate apparatus 14 to accommodate the user who has lined up in the wrong lane. In FIG. 15, the boarding gate apparatus 14 is set to the biometric authentication compatible mode as the initial mode. Also, users 65 and 66 are the registered persons in system who are able to perform the procedure using biometric authentication. A user 67 is the non-registered person in system who lines up in the wrong lane and is not able to perform the procedure using biometric authentication.

As shown in FIG. 15, a situation can occur where the user 67 stands in front of the stop line because the user 66 has headed toward to the boarding gate apparatus 14 and the user 66 has left the stop line, even though the user 65 has not yet completed the procedure.

In this case, since user 67 lines up in the wrong lane, the server apparatus 20 instructs the boarding gate apparatus 14 to change the mode of operation. In response to the instruction, the boarding gate apparatus 14 may process the user 66 using the biometric authentication non-compatible mode when the mode of operation is changed at the timing when the boarding gate apparatus 14 has finished the processing of the user 65.

As a result, the boarding gate apparatus 14 does not transmit an authentication request regarding the user 66 to the server apparatus 20, so the user 66, who should be able to pass through the boarding gate apparatus 14, cannot pass through the boarding gate apparatus 14.

In the second example embodiment, the airport management system that solves the problem will be described.

As the airport management system according to the second example embodiment can have the same configuration as that according to the first example embodiment, the description corresponding to FIG. 3 will be omitted. In addition, as a processing configuration of the server apparatus 20 according to the second example embodiment can have the same processing configurations as that according to the first example embodiment, description thereof will be omitted.

The following description will be made with a focus on the difference between the first example embodiment and the second example embodiment.

When the server apparatus 20 transmits an instruction to change mode of operation, the server apparatus 20 transmits to the boarding gate apparatus 14 biometric information of a waiting person whose mode of operation and type of waiting person are determined to be not consistent (a user who has lined up in the wrong lane).

Specifically, the operation mode control unit 406 of the server apparatus 20 transmits an instruction to change mode of operation that includes the face image used to detect the user and determine the type of waiting person to the boarding gate apparatus 14.

The boarding gate apparatus 14 switches the mode of operation when boarding gate apparatus 14 determines that the corresponding user has arrived in front of own apparatus using the biometric information (face image) transmitted along with the instruction to change mode of operation.

In this case, the biometric information acquisition unit 303 of the boarding gate apparatus 14 operates regardless of the mode of operation and captures images of the front of own apparatus periodically or at predetermined timing. The biometric information acquisition unit 303 hands over the image data acquired by capturing the image to the mode management unit 301.

The mode management unit 301 performs one-to-one matching (one-to-one authentication) using the face image acquired from the biometric information acquisition unit 303 and the face image acquired from the server apparatus 20.

When the one-to-one authentication fails, the mode management unit 301 does not perform any specific operation (does not change the mode of operation).

When the one-to-one authentication is successful, the mode management unit 301 changes the mode of operation of own apparatus from the initial mode to another mode of operation. Specifically, the mode management unit 301 instructs the authentication request unit 304, the function realization unit 305, or the like to change the mode of operation.

In this way, the mode management unit 301 changes the mode of operation of own apparatus from the initial mode to another mode of operation when a face image of the same person as the face image received from the server apparatus 20 is included in the image data acquired by the biometric information acquisition unit 303. In other words, when the boarding gate apparatus 14 receives an instruction to change mode of operation, the boarding gate apparatus 14 switches the mode of operation when the one-to-one authentication is successful using the biometric information of the user who starts the procedure in front of the boarding gate apparatus 14 and the biometric information acquired from the server apparatus 20.

In the example in FIG. 15, even if the instruction to change mode of operation is transmitted to the boarding gate apparatus 14 due to the user 67 who lined up in the wrong lane before the user 66 arrives at the boarding gate apparatus 14, the boarding gate apparatus 14 processes the user 66 in the biometric authentication compatible mode. This is because the face image included in the instruction to change mode of operation is the face image of the user 67, which is different from the face image of the user 66.

After that, when the user 67 arrives in front of the boarding gate apparatus 14, the boarding gate apparatus 14 changes the mode of operation of own apparatus. The boarding gate apparatus 14 can proceed with the procedure for the user 67 who lined up in the wrong lane in the mode of operation (biometric authentication non-compatible mode) that matches the user 67.

As described above, the server apparatus 20 according to the second example embodiment instructs the boarding gate apparatus 14 to change the mode of operation when the type of the waiting person is not consistent with the mode of operation of the boarding gate apparatus 14, and also transmits the biometric information of the waiting person to the boarding gate apparatus 14. The boarding gate apparatus 14 detects that the waiting person has started the procedure using the biometric information of the waiting person and also changes the mode of operation of own apparatus. In the other words, even if an exceptional situation occurs in which a user heads toward the boarding gate apparatus 14 even though the previous user has not yet completed the procedure, the boarding gate apparatus 14 can switch to the mode of operation corresponding to the user who has lined up in the wrong lane. As a result, the throughput of the boarding gate apparatus 14 in the procedure area is improved.

Figure 16:
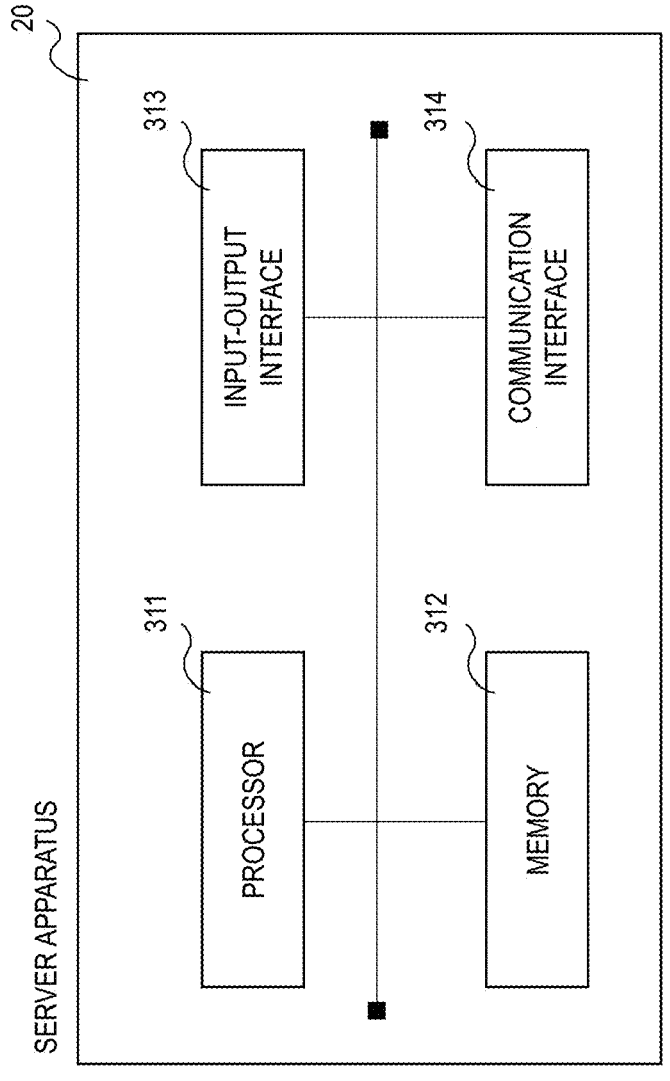
FIG. 16 is a diagram illustrating an example of a hardware configuration of a server apparatus of the present application.

Next, a hardware configuration of an individual apparatus that constitutes the airport management system will be described. FIG. 16 is a diagram illustrating an example of a hardware configuration of the server apparatus 20.

The server apparatus 20 can be configured by an information processing apparatus (a so-called computer) and includes a configuration illustrated as an example in FIG. 16. For example, the server apparatus 20 includes a processor 311, a memory 312, an input-output interface 313, a communication interface 314, and so on. The components such as the processor 311 are connected to an internal bus, and so on so that these components can communicate with each other.

The hardware configuration of the server apparatus 20 is not limited to the configuration illustrated in FIG. 16. The server apparatus 20 may include hardware not illustrated or may be configured without the input-output interface 313 if desired. In addition, the number of components, such as the number of processors 311, included in the server apparatus 20 is not limited to the example illustrated in FIG. 16. For example, a plurality of processors 311 may be included in the server apparatus 20.

For example, the processor 311 is a programmable device such as a CPU (Central Processing Unit), an MPU (Micro Processing Unit), or a DSP (Digital Signal Processor). Alternatively, the processor 311 may be a device such as an FPGA (Field Programmable Gate Array) or an ASIC (Application Specific Integrated Circuit). The processor 311 executes various kinds of programs including an operating system (OS).

The memory 312 is a RAM (Random Access Memory), a ROM (Read-Only Memory), an HDD (Hard Disk Drive), an SSD (Solid State Drive), and so on. The memory 312 stores an OS program, an application program, and various kinds of data.

The input-output interface 313 is an interface for a display apparatus and an input apparatus not illustrated. For example, the display apparatus is a liquid crystal display and so on. For example, the input apparatus is an apparatus that receives user operations, and examples of the input apparatus include a keyboard and a mouse.

The communication interface 314 is a circuit, a module, and so on for performing communication with other apparatuses. For example, the communication interface 314 includes a NIC (Network Interface Card) and so on.

The function of the server apparatus 20 is realized by various kinds of processing modules. The processing modules are realized, for example, by causing the processor 311 to execute a program stored in the memory 312. In addition, this program can be recorded in a computer-readable storage medium. The storage medium may be a non-transient (non-transitory) storage medium, such as a semiconductor memory, a hard disk, a magnetic recording medium, or an optical recording medium. That is, the present invention can be embodied as a computer program product. In addition, the above program may be updated by downloading a program via a network or by using a storage medium in which a program is stored. In addition, the above processing modules may be realized by semiconductor chips.

As is the case with the check-in terminal 10, and so on can each be configured by an information processing apparatus, and the basic hardware configuration of check-in terminal 10, and so on is the same as that of the server apparatus 20. Thus, description of the basic hardware configuration of check-in terminal 10, and so on will be omitted.

The server apparatus 20 which is an information processing device includes a computer and can realize its functions by causing the computer to execute a program. In addition, the server apparatus 20 executes a control method of the server apparatus 20 by using this program.

[Variations]

The configurations, operations, or the like of the airport management system according to the above example embodiments are examples and do not limit the present system configuration, and so on.

In the above example embodiments, an operation of the information processing system of the present application is described using procedures at an airport as example. However, it is not intended to limit the application of the information processing system of the present application to procedures in airports. The information processing system of the present application can be applied to procedures at other facilities and the like. For example, the information processing system of the present application can be applied to admission control at an event venue where persons who have purchased electronic tickets and persons who have purchased paper tickets are mixed. In this case, a user who has purchased an electronic ticket passes through a gate that is compatible with biometric authentication, while a user who has purchased a paper ticket passes through the gate by presenting the paper ticket to a staff member. The server apparatus 20 may analyze the image data acquired from the camera device 30 and switch the mode of operation of the authentication terminal in accordance with the type of waiting person (electronic ticket purchaser or paper ticket purchaser).

The above example embodiments describe a case in which the information processing system of the present application is applied to procedures in the departure area in an airport. However, the information processing system can also be applied to other procedure areas. For example, a user who can pass through the authentication terminal (the gate apparatus 13) installed in the emigration inspection area using biometric authentication and a user who cannot pass through the authentication terminal using biometric authentication (a user who needs to be inspected by an immigration inspector) may be determined. The server apparatus 20 may change the mode of operation of the gate apparatus 13 in accordance with the type of waiting person who lines up in front of the gate apparatus 13.

The above example embodiments describe a case in which a plurality of camera devices 30 corresponding to each boarding gate apparatus 14 is used to detect a waiting person and determine the type of waiting person. However, server apparatus 20 may detect waiting persons using image data obtained from a single camera device 30 and determine the type of waiting person. Specifically, the server apparatus 20 may identify the lane in which the user is lined up according to a position of the user that appears in the image data, and detect the waiting person, or the like.

The above example embodiments describe that the boarding gate apparatus 14 can switch between the biometric authentication compatible mode and the biometric authentication non-compatible mode. Furthermore, it is described that in the biometric authentication compatible mode, the staff member reads the boarding pass into the boarding gate apparatus 14, and the boarding gate apparatus 14 controls the passage of the user based on the boarding pass that has been read. Here, the biometric authentication non-compatible mode also includes other modes other than those mentioned above. For example, a bypass mode that takes into consideration a user in a wheelchair, and so on, and a self-mode in which the user himself/herself reads his/her passport and boarding pass into the boarding gate apparatus 14 are also included in the biometric authentication non-compatible mode. In the bypass mode, the boarding gate apparatus 14 does not control the gate (flapper). The staff member determines whether the user is permitted to pass through the gate or not. Furthermore, in the self-mode, the boarding gate apparatus 14 performs identity verification using a face image described in the passport and a face image acquired by capturing the user, and when the identity verification is successful, the boarding gate apparatus 14 determines whether the user is permitted to pass through the gate based on information on the read boarding pass. In this way, various modes are included in the biometric authentication non-compatible mode. In consideration of the above, the biometric authentication compatible mode corresponds to a walk-through mode, in which a user who can pass through the gate can pass through the gate in the walk-through manner. On the other hand, the biometric authentication non-compatible mode corresponds to a non-walk-through mode in which a user needs to stop at the gate and complete a procedure, even if the user is able to pass through the gate.

The server apparatus 20 may notify the staff member waiting in the departure area of the type of waiting person. In particular, the server apparatus 20 may notify the staff member of the type of user (waiting person) who lined up in the wrong lane. For example, in the example in FIG. 6, the server apparatus 20 (the waiting person type notification unit 405) notifies the staff member 64 of the type of the user 63 who has lined up in the lane of the boarding gate apparatus 14-1, which is set to the biometric authentication compatible mode. Specifically, the server apparatus 20 notifies a terminal (not shown) possessed by the staff member 64 of the type of the user 63. Upon receiving the notification, the staff member 64 recognizes that the user 63 cannot pass through the boarding gate apparatus 14 using biometric authentication, and therefore, the staff member 64 needs to acquire the passport and boarding pass from the user 63 and perform a predetermined procedure. Similarly, the server apparatus 20 notifies the staff member 61 of the type of the user 62 who lines up in the lane of the boarding gate apparatus 14-4 that is set to the biometric authentication non-compatible mode. The server apparatus 20 notifies the terminal (not shown) possessed by the staff member 61 of the type of the user 62. Upon receiving the notification, the staff member 61 does not take any special action and watches the user 62 pass through the gate, since the user 62 can pass through the boarding gate apparatus 14-4 using biometric authentication.

Alternatively, the server apparatus 20 (the operation mode control unit 406) may notify the staff member that the mode of operation of the boarding gate apparatus 14 will be switched. The staff member who has received the notification may take action in accordance with the mode of operation that has been switched.

The above example embodiments describe a case in which the authentication terminal (for example, the boarding gate apparatus 14) determines whether or not a user is permitted to pass through the gate. However, the server apparatus 20 may also perform the determination. For example, regarding whether or not the user is permitted to pass through the boarding gate apparatus 14, the server apparatus 20 may determine whether or not the user is permitted to pass through the boarding gate apparatus 14 based on the boarding pass information and information (airline code, flight number, and the like) set in the boarding gate apparatus 14. The server apparatus 20 may set the result of the authentication processing (authentication success, authentication failure) based on the result of determination.

The above example embodiments describe a case in which biometric information related to a face image is transmitted and received between the apparatuses. However, a feature value generated from the face image may also be transmitted and received between the apparatuses. In this case, the server apparatus 20 on the receiving side may use the received feature value and utilize the received feature value in subsequent processing. Alternatively, biometric information stored in the registered person information database may be a feature value or a face image. When the face image is stored, the feature value may be generated from the face image as needed. Alternatively, both the face image and the feature value may be stored in the registered person information database.

The server apparatus 20 may retain a history of switching mode of operation at the boarding gate apparatus 14 and present the history to the airline staff member, or the like. The airline staff member, or the like, may grasp characteristics of users who are likely to line up in the wrong lane, characteristics, and the like of lanes where users are likely to line up by mistake, and use this information to improve operations. Alternatively, the server apparatus 20 may analyze the history and calculate the characteristics of the users who are likely to line up in the wrong lane. For example, the server apparatus 20 may estimate attributes (for example, age) of the users who lined up in the wrong lane, and calculate the number of the users who lined up in the wrong lane for each attribute. Alternatively, the server apparatus 20 may identify the lane in which the users are more likely to line up by mistake.

The above example embodiment describes a case in which a registered person information database is configured inside the server apparatus 20, but the database may be established in an external database server or the like. That is, some of the functions of the server apparatus 20 may be implemented in another server. More specifically, the "waiting person type determination unit (waiting person type determination means)", "operation mode control unit (operation mode control means), and so on described above may be implemented in any of the apparatuses included in the system.

While the data exchange between each apparatus (the server apparatus 20, and the check-in terminal 10, and so on) is not limited to any particular mode, data exchanged between these apparatuses may be encrypted. It is desirable that the passport information, and so on are transmitted and received between these apparatuses and encrypted data is transmitted and received in order to properly protect this information.

In the flowcharts and sequence diagrams used in the above description, a plurality of steps (processes) are sequentially described. However, the order of the execution of the steps performed in the individual example embodiment is not limited to the described order. In the individual example embodiment, the order of the illustrated steps may be changed to the extent that a problem is not caused on the content of the individual example embodiment. For example, individual processes may be executed in parallel.

The above example embodiments have been described in detail to facilitate the understanding of the present application disclosed and not to mean that all the configurations described above are needed. In addition, if a plurality of example embodiments have been described, each of the example embodiments may be used individually or a plurality of example embodiments may be used in combination. For example, part of a configuration according to one example embodiment may be replaced by a configuration according to another example embodiment. For example, a configuration according to one example embodiment may be added to a configuration according to another example embodiment. In addition, addition, deletion, or replacement is possible between part of a configuration according to one example embodiment and another configuration.

The industrial applicability of the present invention has been made apparent by the above description. That is, the present invention is suitably applicable, for example, to airport management systems and the like regarding users who use aircraft and the like.

A part or the entirety of the example embodiments described above may be described as in the following supplementary notes, but is not limited to the followings.

[Supplementary Note 1]

A system, including:

an authentication terminal that can operate in different modes of operation corresponding to each of different procedure methods; and a server apparatus, wherein the server apparatus includes:

a detection unit that detects a waiting person waiting at a waiting area, where procedures are performed at the authentication terminal, using image data captured at the waiting area;

a determination unit that determines a type of the waiting person regarding the procedures to be proceeded with at the authentication terminal; and a mode control unit that instructs the authentication terminal to change a mode of operation, when the type of the waiting person is not consistent with the mode of operation of the authentication terminal.

[Supplementary Note 2]

The system according to supplementary note 1, wherein the detection unit extracts a face image from the image data, calculates a distance between eyes from the extracted face image, and detects the waiting person based on the calculated distance between the eyes.

[Supplementary Note 3]

The system according to supplementary note 2, wherein the detection unit, when at least one or more face images are extracted from the image data, identifies a face image that has the distance between the eyes longer than a predetermined threshold and the distance between the eyes longest among the at least one or more face images, and detects a person corresponding to the identified face image as the waiting person.

[Supplementary Note 4]

The system according to any one of supplementary notes 1 to 3, wherein the detection unit determines whether the waiting person is a registered person in system who can proceed with a procedure at the authentication terminal using biometric authentication by registering own biometric information with the system, or whether the waiting person is a non-registered person in system who cannot proceed with the procedure using the biometric authentication.

[Supplementary Note 5]

The system according to supplementary note 4, wherein the server apparatus further includes a database that store the biometric information of the registered person in system, and wherein the determination unit determines whether the waiting person is the registered person in system or the non-registered person in system by a matching processing using biometric information of the waiting person and the biometric information stored in the database.

[Supplementary Note 6]

The system according to supplementary note 5, wherein the biometric information is a face image or feature value extracted from the face image.

[Supplementary Note 7]

The system according to supplementary note 5 or 6, wherein the authentication terminal can switch between a biometric authentication compatible mode which supports the biometric authentication and a biometric authentication non-compatible mode which supports a method other than the biometric authentication, and wherein the mode control unit instructs the authentication terminal to change the mode of operation when the authentication terminal operates in the biometric authentication compatible mode and the waiting person is the non-registered person in system or when the authentication terminal operates in the biometric authentication non-compatible mode and the waiting person is the registered person in system.

[Supplementary Note 8]

The system according to supplementary note 7, wherein the authentication terminal operates in either the biometric authentication compatible mode or the biometric authentication non-compatible mode as an initial mode, and wherein the mode control unit temporarily changes the mode of operation of the authentication terminal when the type of the waiting person is not consistent with the initial mode of the authentication terminal.

[Supplementary Note 9]

The system according to any one of supplementary notes 1 to 8, wherein the mode control unit instructs the authentication terminal to change the mode of operation when the type of the waiting person is not consistent with the mode of operation of the authentication terminal, and transmits the biometric information of the waiting person to the authentication terminal.

[Supplementary Note 10]

The system according to supplementary note 9, wherein the authentication terminal detects that the waiting person has started the procedure by using the biometric information of the waiting person, and changes the mode of operation of own apparatus.

[Supplementary Note 11]

The system according to supplementary note 10, wherein the authentication terminal switches the mode of operation when the authentication terminal succeeds in one-to-one authentication using the biometric information of a user who starts the procedure and the biometric information acquired from the server apparatus.

[Supplementary Note 12]

A server apparatus, including:

a detection unit that detects a waiting person waiting at a waiting area, where procedures are performed at an authentication terminal that can operate in different modes of operation corresponding to each of different procedure methods, using image data captured at the waiting area;

31 a determination unit that determines a type of the waiting person regarding the procedures to be proceeded with at the authentication terminal; and a mode control unit that instructs the authentication terminal to change a mode of operation, when the type of the waiting person is not consistent with the mode of operation of the authentication terminal.

[Supplementary Note 13]

A control method of a server apparatus, the control method comprising: detecting a waiting person waiting at a waiting area, where procedures are performed at an authentication terminal that can operate in different modes of operation corresponding to each of different procedure methods, using image data captured at the waiting area;

determining a type of the waiting person regarding the procedures to be proceeded with at the authentication terminal; and instructing the authentication terminal to change a mode of operation, when the type of the waiting person is not consistent with the mode of operation of the authentication terminal.

[Supplementary Note 14]

A computer-readable storage medium storing a program causing a computer mounted on a server apparatus to perform processing for: detecting a waiting person waiting at a waiting area, where procedures are performed at an authentication terminal that can operate in different modes of operation corresponding to each of different procedure methods, using image data captured at the waiting area;

determining a type of the waiting person regarding the procedures to be proceeded with at the authentication terminal; and instructing the authentication terminal to change a mode of operation, when the type of the waiting person is not consistent with the mode of operation of the authentication terminal.

The entire disclosure of the above patent literature is incorporated herein by reference thereto. While the example embodiments of the present invention have thus been described, the present invention is not limited to these example embodiments. It is to be understood to those skilled in the art that these example embodiments are only examples and that various variations are possible without departing from the scope and sprit of the present invention. That is, the present invention of course includes various variations and modifications that could be made by those skilled in the art in accordance with the overall disclosure including the claims and the technical concept.

REFERENCE SIGNS LIST 10 check-in terminal
11 baggage drop machine
12 passenger clearance system
13 gate apparatus
14 boarding gate apparatus
14-1 boarding gate apparatus
14-2 boarding gate apparatus
14-3 boarding gate apparatus
14-4 boarding gate apparatus
20 server apparatus
30 camera device
30-1 camera device
30-2 camera device
30-3 camera device
30-4 camera device
40 display device

32

51 stop line
52 fence
61 staff member
62 user
63 user
64 staff member
65 user
66 user
67 user
101 authentication terminal
102 server apparatus
111 detection unit
112 determination unit
113 mode control unit
201 communication control unit
202 check-in execution unit
203 system registration unit
204 message output unit
205 storage unit
301 mode management unit
302 communication control unit
303 biometric information acquisition unit
304 authentication request unit
305 function realization unit
306 storage unit
311 processor
312 memory
313 input-output interface
314 communication interface
401 communication control unit
402 token issuing unit
403 authentication request processing unit
404 user detection unit
405 waiting person type determination unit
406 operation mode control unit
407 storage unit

What is claimed is:

1. A system, comprising:

an authentication terminal that can operate in different modes of operation corresponding to each of different procedure methods; and a server apparatus, wherein the server apparatus comprises:

at least one memory storing a set of instructions; and at least one processor configured to execute the set of instructions to:

detect a waiting person waiting at a waiting area, where procedures are performed at the authentication terminal, using image data captured at the waiting area;

determine a type of the waiting person regarding the procedures to be proceeded with at the authentication terminal;

instruct the authentication terminal to change a mode of operation, when the type of the waiting person is not consistent with the mode of operation of the authentication terminal; and extract a face image from the image data, calculate a distance between eyes from the extracted face image, and detect the waiting person based on the calculated distance between the eyes, wherein when at least one or more face images are extracted from the image data, identify a face image that has the distance between the eyes longer than a predetermined threshold and the distance between the eyes is the longest among the at least one or more face images, and detect a person corresponding to the identified face image as the waiting person.

2. The system according to, claim 1, wherein the at least one processor is further configured to execute the set of instructions to determine whether the waiting person is a registered person who can proceed with a procedure at the authentication terminal using biometric authentication by registering own biometric information with the system, or whether the waiting person is a non-registered person who cannot proceed with the procedure using the biometric authentication.

3. The system according to claim 2, wherein the server apparatus further comprises a database that store the biometric information of the registered person, and wherein the at least one processor is further configured to execute the set of instructions to:

determine whether the waiting person is the registered person or the non-registered person by a matching processing using biometric information of the waiting person and the biometric information stored in the database.

4. The system according to claim 3, wherein the biometric information is a face image or feature value extracted from the face image.

5. The system according to claim 3, wherein the authentication terminal can switch between a biometric authentication compatible mode which supports the biometric authentication and a biometric authentication non-compatible mode which supports a method other than the biometric authentication, and wherein the at least one processor is further configured to execute the set of instructions to:

instruct the authentication terminal to change the mode of operation when the authentication terminal operates in the biometric authentication compatible mode and the waiting person is the non-registered person or when the authentication terminal operates in the biometric authentication non-compatible mode and the waiting person is the registered person.

6. The system according to claim 5, wherein the authentication terminal operates in either the biometric authentication compatible mode or the biometric authentication non-compatible mode as an initial mode, and wherein the at least one processor is further configured to execute the set of instructions to:

temporarily change the mode of operation of the authentication terminal when the type of the waiting person is not consistent with the initial mode of the authentication terminal.

7. The system according to claim 1, wherein the at least one processor is further configured to execute the set of instructions to:

instruct the authentication terminal to change the mode of operation when the type of the waiting person is not consistent with the mode of operation of the authentication terminal, and transmit the biometric information of the waiting person to the authentication terminal.

8. The system according to claim 7, wherein the authentication terminal detects that the waiting person has started the procedure by using the biometric information of the waiting person, and changes the mode of operation of the authentication terminal.

9. The system according to claim 8, wherein the authentication terminal switches the mode of operation when the authentication terminal succeeds in one-to-one authentication using the biometric information of a user who starts the procedure and the biometric information acquired from the server apparatus.

10. A server apparatus, comprising:

at least one memory storing a set of instructions; and at least one processor configured to execute the set of instructions to:

detect a waiting person waiting at a waiting area, where procedures are performed at an authentication terminal that can operate in different modes of operation corresponding to each of different procedure methods, using image data captured at the waiting area;

determine a type of the waiting person regarding the procedures to be proceeded with at the authentication terminal;

instruct the authentication terminal to change a mode of operation, when the type of the waiting person is not consistent with the mode of operation of the authentication terminal; and extracting a face image from the image data, calculating a distance between eyes from the extracted face image, and detecting the waiting person based on the calculated distance between the eyes, wherein when at least one or more face images are extracted from the image data, identifying a face image that has the distance between the eyes longer than a predetermined threshold and the distance between the eyes is the longest among the at least one or more face images, and detecting a person corresponding to the identified face image as the waiting person.

11. A control method of a server apparatus, the control method comprising:

detecting a waiting person waiting at a waiting area, where procedures are performed at an authentication terminal that can operate in different modes of operation corresponding to each of different procedure methods, using image data captured at the waiting area;

determining a type of the waiting person regarding the procedures to be proceeded with at the authentication terminal;

instructing the authentication terminal to change a mode of operation, when the type of the waiting person is not consistent with the mode of operation of the authentication terminal; and extracting a face image from the image data, calculating a distance between eyes from the extracted face image, and detecting the waiting person based on the calculated distance between the eyes, wherein when at least one or more face images are extracted from the image data, identifying a face image that has the distance between the eyes longer than a predetermined threshold and the distance between the eyes is the longest among the at least one or more face images, and detecting a person corresponding to the identified face image as the waiting person.

* * * * *